United States Patent
Mastrantuono et al.

(10) Patent No.: US 8,090,345 B2
(45) Date of Patent: Jan. 3, 2012

(54) MULTIPLE CHANNEL AUTOMATED REFILL SYSTEM

(75) Inventors: Domenico Mastrantuono, Rome (IT); Jacopo Clemenzi, Rome (IT)

(73) Assignee: Accenture Global Services Limited, Dublin (IE)

( * ) Notice: Subject to any disclaimer, the term of this patent is extended or adjusted under 35 U.S.C. 154(b) by 1095 days.

(21) Appl. No.: 11/973,762

(22) Filed: Oct. 9, 2007

(65) Prior Publication Data

US 2009/0047926 A1    Feb. 19, 2009

(30) Foreign Application Priority Data

Aug. 17, 2007    (EP) .................................... 07425536

(51) Int. Cl.
*H04M 11/00* (2006.01)
(52) U.S. Cl. ................ 455/405; 705/403; 379/114.2
(58) Field of Classification Search .................. 455/405, 455/406, 407, 408, 409
See application file for complete search history.

(56) References Cited

U.S. PATENT DOCUMENTS

| | | | |
|---|---|---|---|
| 6,597,776 B1 | 7/2003 | Walker et al. | 379/114.26 |
| 2001/0028705 A1* | 10/2001 | Adams et al. | 379/114.2 |
| 2004/0015366 A1 | 1/2004 | Wiseman et al. | 705/1 |
| 2004/0172362 A1 | 9/2004 | Hausmann et al. | 705/41 |
| 2004/0185827 A1 | 9/2004 | Parks | 455/406 |
| 2005/0100148 A1 | 5/2005 | Wakins et al. | 379/114.2 |
| 2006/0149690 A1* | 7/2006 | Lau et al. | 705/403 |
| 2009/0005000 A1* | 1/2009 | Baker et al. | 455/405 |

FOREIGN PATENT DOCUMENTS

| | | |
|---|---|---|
| WO | WO 99/30480 A | 6/1999 |
| WO | WO 01/28220 A | 4/2001 |
| WO | WO 03/010951 A | 2/2003 |

OTHER PUBLICATIONS

International Search Report in International Application No. EP 07 425 536.5, dated Dec. 20, 2007, 4 pages.
Written Opinion in International Application No. EP 07 425 536.5, dated Dec. 20, 2007, 5 pages.

* cited by examiner

*Primary Examiner* — Nick Corsaro
*Assistant Examiner* — Gerald Johnson
(74) *Attorney, Agent, or Firm* — Brinks Hofer Gilson & Lione

(57) ABSTRACT

An automatic refill system for pre-paid accounts provides enhanced funding flexibility for customers and additional revenue streams for a telecommunication service provider. The automatic refill system solves the technical challenges involved with implementing a scheduled refill channel co-existing with a triggered refill channel for funding a pre-paid account. The scheduled channel regularly refills the pre-paid account. The telecommunication service provider also coordinates funding through a triggered refill channel that refills the pre-paid account when specific conditions are met, such as account balance falling below a threshold.

24 Claims, 13 Drawing Sheets

MULTIPLE CHANNEL AUTOMATED REFILL SYSTEM

PRIORITY CLAIM

This application claims the benefit of priority from European Patent Application No. 07425536.5, filed Aug. 17, 2007.

BACKGROUND

1. Technical Field

This application relates to an automatic refill system for refilling a pre-paid account of a telecommunications customer, and in particular, an automatic refill system that implements multiple different refill channels for refilling the pre-paid account.

2. Related Art

Telecommunication customers purchase service plans from telecommunication service providers. The service plan often specifies the amount of time available under the service plan, the cost of call time through the service plan, the telecommunications services that the customer may use (e.g., long distance calling and text messaging), and additional charges incurred when the customer exceeds the time allotted under the service plan. To track the telecommunication customer's usage of the service plan, a telecommunication provider establishes one or more customer accounts associated with the telecommunication customer. A customer account typically includes information about the customer such as demographic information, service plan information, and the customer's billing history. The customer account is usually stored in a database of customer accounts, and is generally only accessible to the telecommunication service provider.

As the telecommunication customer uses time under the service plan, an equal or proportionate amount of time is subtracted from the remaining time balance in the telecommunication customer's service plan. Some service plans associate a monetary value with telecommunication service usage, and instead of (or in addition to) tracking elapsed time under the service plan, the telecommunication customer spends down the remaining monetary balance in the telecommunication customer's service plan. In either scenario, once the telecommunication customer has used the time or monetary amount available under the service plan, the telecommunication customer must purchase additional time or add to the remaining monetary balance. Funding the customer account is often a time consuming process, a difficult process for less technologically adept customers, and a frustrating process for customers who forget to fund their account in a timely manner to avoid frequent and irritating service interruption.

Funding the account also poses significant technical problems. For example, a telecommunication service provider may not know when or by how much to refill a customer's service plan without constantly bothering the customer. As another example, technical challenges exists with regard to extending legacy telecommunication service provider architectures to evolve in complex ways to support flexible funding options. Even if flexible funding options were available, the technical problem exists of establishing a flexible, efficient, and robust mechanism for configuring the telecommunication service provider to implement the flexible funding options.

Another technical problem exists with configuring a telecommunication service provider to flexibly distinguish between and process multiple customer types, including corporate customers and family customers. A corporation may purchase a service plan for its employees or the head of a household may purchase a service plan for the family members. However, the employees or family members may not have the ability or authorization to refill the service plan after or immediately before the service plan is depleted. Thus, when an employee or family member depletes the service plan, that employee or family member deprives the other employees or family members of the ability to use the service plan, and furthermore, must contact the employer or head of household to refill the service plan. In other words, a technical problem exists with respect to funding a customer account by a related customer. There are technical challenges associated with solving the problem of how to allow a related customer to fund a specific account, including how to resolve which account (e.g., the employee's (pre-paid) or the employer's (post-paid)) to bill to refill a service plan.

Hence, there is a need for a system that addresses the problems noted above and others previously experienced.

SUMMARY

A telecommunication service provider automatic refill system includes a billing system in communication with one or more customer accounts. The customer accounts may be pre-paid accounts, post-paid accounts, or combinations thereof. The automatic refill system stores information about the one or more customer accounts in corresponding one or more configuration records in a customer database. The automatic refill system uses customer account identifiers to link the configuration records with their corresponding customer accounts. The billing system of the automatic refill system is operable to receive the customer account identifiers to retrieve information stored in the corresponding configuration records.

The automatic refill system further implements multiple refill channels. The refill channels include a triggered refill channel, a scheduled refill channel, or any other types of refill channels. The refill channels are in communication with the billing system. In one embodiment, the billing system implements the refill channels. The customer accounts may have one or more refill conditions, such as a triggered refill condition or a scheduled refill condition. The triggered refill channel is operable to refill a pre-paid customer account when a triggered refill condition is met. Similarly, the scheduled refill channel is operable to refill a pre-paid customer account when a scheduled refill condition is met. Refilling a pre-paid customer account may include executing a refill funding procedure, such as a triggered refill funding procedure or a scheduled refill funding procedure.

The automatic refill system, the billing system, or any other system, configures the configuration records with one or more data fields relating to the triggered refill channel or the scheduled refill channel. These data fields may include a variety of data fields, including an executed date data field, a refill activation data field, a refill status data field, a refill amount data field, a scheduled condition data field, or a triggered refill amount data field. These data fields may be used by multiple systems or channels, such as the billing system, the scheduled refill channel, or the triggered refill channel in making determinations regarding the customer accounts or for performing a refill funding procedure.

The automatic refill system further provides functionality for linking a post-paid account with a pre-paid account. The post-paid account may be linked to the pre-paid account through a post-paid account identifier stored in a post-paid account identifier data field of the configuration record for the pre-paid account. Linking the post-paid account to the pre-paid account allows one or more refill channels to apply an automatic refill payment to the pre-paid account. An automatic refill payment may be a payment made to increase a balance, such as a monetary balance or a time balance of the pre-paid account. When the automatic refill payment is made, an adjustment in a corresponding amount to the automatic refill payment is then applied to the post-paid account. Hence, the post-paid account can be used to maintain the balance remaining in the pre-paid account. The automatic refill system may also link one or more pre-paid accounts with a post-paid account. For example, a corporation may have a post-paid account and the employees of the corporation may each have pre-paid accounts linked with the post-paid account. In a similar situation, the head of a family household may have a post-paid account and the family members may each have a pre-paid account linked with the head of the family's post-paid account.

The automatic fill system also provides technical solutions to several technical problems. For example, the automatic refill system provides flexible funding options to pre-paid customer accounts using automatic refill channels, such as the triggered refill channel and the scheduled refill channel. Using these automatic refill channels, the automatic refill system is able to monitor the balance of a pre-paid customer account and can automatically refill the pre-paid customer account. Hence, a telecommunication service is able to automatically refill a customer's service plan without having to constantly bother the customer. Furthermore, the automatic refill system can flexibly distinguish between and process multiple customer types by configuring pre-paid customer accounts and post-paid customer accounts. Thus, the automatic refill system can accommodate multiple types of customer accounts.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
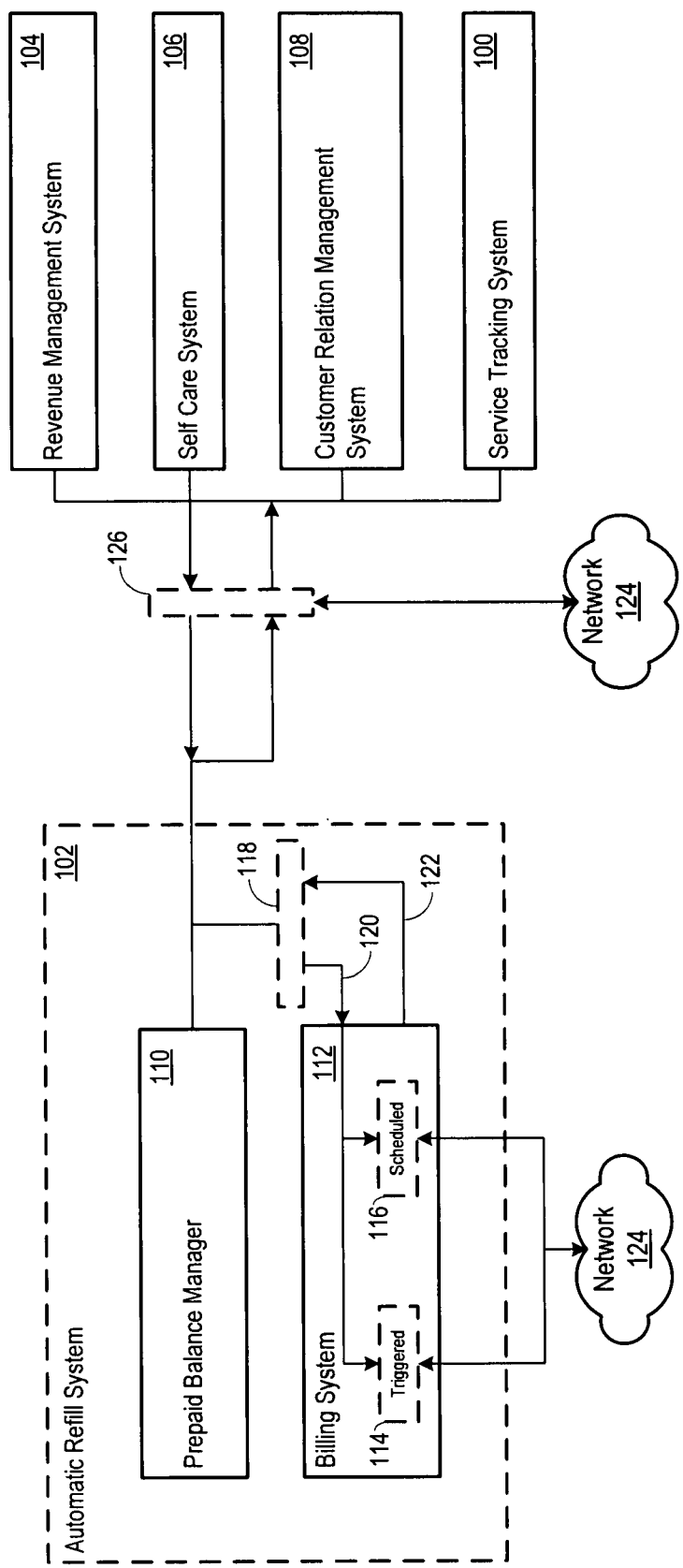
FIG. 1 shows an implementation of an automatic refill system having a billing system that implements multiple refill channels.

FIG. 1 shows a automatic refill system 102 that implements a billing system 112 for billing pre-paid customer accounts using multiple automated refill channels. The automatic refill system 102 also includes a pre-paid balance manager 110. In one implementation, the automatic refill system 102 is in communication with a service tracking system 100, revenue management system 104, a self care system 106, and a customer relation management system 108.

The systems 100-112 may be in communication with each other, with only specific systems, or with external systems. As examples, the self care system 106 may communicate with the pre-paid balance manager 110, and the billing system 112 may communicate with the pre-paid balance manager 110, the revenue management system 104, the customer relation management system 108, or any other system. Other communication pathways are also possible.

In one implementation, the systems 100-112 are implemented with Accenture Communications Solutions™ components available from Accenture S.p.A of Rome, Italy. In other implementations, the Geneva™ platform available from Convergys of Chicago, Ill. and/or the Siebel 7.7 CME™ platform available from Siebel Systems, Inc. of San Mateo, Calif., may implement one or more of the systems 100-112. The systems 100-112 may run under the Unix™, Windows NT/2000/XP™, Linux™, or other operating system. Underlying databases may be implemented with an Oracle™ SQL database platform available from Oracle of Redwood Shores, Calif., Microsoft™ SQL database platform available from Microsoft Corporation of Redmond, Wash., and/or Siebel™ SQL database platform. The systems 100-112 may be implemented in other manners, however.

The systems implemented by the automatic refill system 102 communicate using messages. The messages may be related to the services the automatic refill system 102 provides or the actions the automatic refill system 102 performs. For example, and without limitation, messages may include requests to start a service, requests to stop a service, requests to create a new customer account, requests to terminate a customer account, balance inquiries for a customer account, pre-paid refill action messages, post-paid refill action messages, any other message now known or later developed, or combinations thereof.

In one implementation, the self care system 106 allows one or more telecommunication customers to manage corresponding customer accounts. The self care system 106 may process messages that are pre-paid account refill actions. The self care system 106 may communicate refill messages to the pre-paid balance manager 110, the billing system 112, or any other system in communication with the automatic refill system 102. Other systems, such as the pre-paid balance manager 110 or the billing system 112, accordingly update rating balance information stored locally by the automatic refill system 102.

The customer relation management system 108 may communicate customer management messages to the pre-paid balance manager 110, the revenue management system 104, or any other system. For example, the customer relation management system 108 and the revenue management system 104 may communicate balance adjustment messages, dispute resolution messages, or other messages to one another. Accordingly, all of the functionality within the telecommunications support architecture 102 has access to and may report a consistent view of customer data.

In one implementation, the service tracking system 100 tracks service usage by one or more customers. The service tracking system 100 may process messages related to the amount and type of service used by one or more customers. The service tracking system 100 may also communicate with one or more of the systems 102-112 to determine the amount of service used by a customer, and the amount to bill the customer for the service used. For example, the service tracking system 100 may communicate with the billing system 112 or the pre-paid balance manager 110 to determine the service usage cost for one or more customers.

The pre-paid balance manager 110 may monitor and track ongoing usage of pre-paid telecommunications services. For example, when a pre-paid customer has pre-paid for cellular phone service, a system such as the service tracking system 100, the customer relation management system 108, or the billing system 112, may monitor the duration of a service provided. These systems may provide cost updates to the pre-paid balance manager 110. In response, the pre-paid balance manager 110 continuously decrements the pre-paid account balance for the pre-paid customer account. Accordingly, the pre-paid balance manager 110 may determine when the pre-paid customer account balance is exhausted, and, in response, transmit a message to the billing system 112 informing the billing system 112 that the pre-paid customer account balance is exhausted. The Am-Beo ncharge™ and/or nRate™ platform may implement the pre-paid balance manager 110, and may maintain pre-paid customer account information.

The billing system 112 generates usage statements and/or invoices for customers, such as the pre-paid customers or post-paid customers. In handling pre-paid and post-paid customer accounts, the billing system 112 may maintain both rating balances and account balances, and may exercise centralized control over the rating balances and account balances. In other words, the billing system 112 may have mastership (e.g., has exclusive create, update, and delete access) of the rating balances and account balances in the automatic refill system 102. However, in other implementations, the customer relation management system 108 or other system may establish mastership of the rating balances and account balances.

The billing system 112 may also implement multiple automatic refill channels. In one implementation, the billing system 112 implements a triggered refill channel 114 and a scheduled refill channel 116. The triggered refill channel 114 or the scheduled refill channel 116 may be activated for a customer account. For example, a pre-paid customer account may be configured for the triggered refill channel 114 only, the scheduled refill channel 116 only, or may be configured for both.

Scheduled and triggered refill features for a pre-paid customer account may be implemented using a product for the scheduled refill channel 116 and a product for a triggered refill channel 114. In one implementation, the automatic refill system 102 can be configured by inserting rows into a catalogue mapping table (e.g., the CATALOGUE_MAPPING table shown below in Table 1) and a product configuration tables. These tables store the information that the customer relationship management system 108 or other system uses to interact with the billing system 112 when carrying out a scheduled or triggered refill. These tables also contain the configuration of the parameters for each product that are used during the automatic refill activation and its operation.

The triggered refill channel 114 may execute a triggered refill funding procedure for a customer account when a triggered refill condition is met. A triggered refill condition may specify performing a refill funding procedure when the pre-paid customer account balance is less than a predetermined threshold amount or when the pre-paid account meets other conditions. For example, the triggered refill channel 114 may execute a triggered refill funding procedure when a predetermined threshold amount for a pre-paid customer account is $250.00 and the balance remaining on the customer account is $240.00. Similarly, the triggered refill channel 114 may execute a triggered refill funding procedure if the predetermined threshold amount for a pre-paid customer account is 30 minutes and the balance remaining on the pre-paid customer accounts is 25 minutes. The triggered refill channel 114 or the billing system 112 may determine whether the triggered refill condition is met.

In one implementation, the triggered refill channel 114 is activated on a pre-paid customer account when the pre-paid customer subscribes to the product for the triggered refill channel 114. Activating the product for the pre-paid customer account may be performed by one or more systems, such as the customer relation management system 108. The configuration of the CATALOGUE_MAPPING table, shown in Table 1, allows the association of one or more parameters sent by the customer relation management system 108 to the parameters related to the triggered refill funding procedure. A row inserted into the CATALOGUE_MAPPING table that facilitates this association is shown below:

TABLE 1

| CATALOGUE_MAPPING | |
|---|---|
| Product_Description | Triggered Refill |
| Product-Integ_id | <product integration id> |
| Organization_id | 100 |
| Tariff_Parameter_value | Null |
| Bill_Parameter_1_value | Null |
| Bill_Parameter_2_value | Null |
| Bill_Entity_Type | product |
| Bill_Entity_id | <entity id in billing system> |
| Process_DA | orgCode |
| General_1 | Null |
| General_2 | Null |
| General_3 | RefillAmount |
| General_4 | RefillThreshold |
| General_5 | PaymentMethod |
| General_6 | PostPaidAccountNumber |
| General_7 | Null |
| General_8 | Null |
| General_9 | Null |
| General_10 | Null |
| Network_Name | Null |
| Service_Name | Null |

As shown in the CATALOGUE_MAPPING table, the customer relation management system 108 may send messages having 10 or more general data fields to the billing system 112. The CATALOGUE_MAPPING table facilitates the association of the general data fields to data fields used by the triggered refill channel 114. The parameters related to the product for the triggered refill feature include the General_3 data field, the General_4 data field, the General_5 data field, and the General_6 data field. Other data fields may also be used to facilitate a triggered refill funding procedure.

A product configuration table for the triggered refill product is shown below in Table 2.

TABLE 2

| Name | Triggered Refill |
| --- | --- |
| Initial Status | Active |
| Product | Yes |
| Allow Multiple Product | Yes |

The configuration of the triggered refill product is performed according with the configuration in the CATALOGUE MAPPING in Table 1 to use the general fields to store in the billing system input values defined during automatic refill activation.

The scheduled refill channel 116 may execute a scheduled refill funding procedure for a pre-paid customer account when a scheduled refill condition is met. In one implementation, the scheduled refill channel 116 may be configured to replenish the balance of a pre-paid customer account according to a predetermined schedule. For example, the scheduled refill channel 116 may check on each calendar day to determine whether a scheduled refill funding procedure should be performed for one or more pre-paid customer accounts. In another example, a pre-paid customer account may be configured such that the scheduled refill channel 116 performs a scheduled refill procedure on a specified date of each month of a calendar year. Hence, a scheduled refill condition may be met when the scheduled refill channel 116 determines that the current calendar date is equal to the predetermined calendar date for the pre-paid customer account. The determination of whether a pre-paid customer account should be refilled using the scheduled refill channel 116 may be performed by the billing system 112, the scheduled refill channel 116, or any other system of the automatic refill system 102.

In one implementation, the scheduled refill channel 116 is activated on a pre-paid customer account when the pre-paid customer subscribes to the product for the scheduled refill channel 116. Activating the product for the pre-paid customer account may be performed by one or more systems, such as the customer relation management system 108. The configuration of the CATALOGUE_MAPPING table, shown in Table 4, allows the association of one or more parameters sent by the customer relation management system 108 to the parameters related to the scheduled refill funding procedure. A row inserted into the CATALOGUE_MAPPING that facilitates this association is shown below:

TABLE 3

| CATALOGUE_MAPPING | |
| --- | --- |
| Product_Description | Scheduled Refill |
| Product-Integ_id | <product integration id> |
| Organization_id | 100 |
| Tariff_Parameter_value | null |
| Bill_Parameter_1_value | null |
| Bill_Parameter_2_value | null |
| Bill_Entity_Type | product |
| Bill_Entity_id | <entity id in billing system> |
| Process_DA | orgCode |
| General_1 | null |
| General_2 | null |
| General_3 | RefillAmount |

TABLE 3-continued

| CATALOGUE_MAPPING | |
| --- | --- |
| General_4 | RefillDate |
| General_5 | PaymentMethod |
| General_6 | PostPaidAccountNumber |
| General_7 | null |
| General_8 | null |
| General_9 | null |
| General_10 | null |
| Network_Name | null |
| Service_Name | null |

As shown in the CATALOGUE_MAPPING table, the customer relation management system 108 may send messages having 10 or more general data fields to the billing system 112. The CATALOGUE_MAPPING table facilitates the association of the general data fields to data fields used by the scheduled refill channel 116. The parameters related to the product for the triggered refill feature include the General_3 data field, the General_4 data field, the General_5 data field, and the General_6 data field. Other data fields may also be used to facilitate a triggered refill funding procedure.

A product configuration table for the scheduled refill product is shown below in Table 4.

TABLE 4

| Name | Scheduled Refill |
| --- | --- |
| Initial Status | Active |
| Product | Yes |
| Allow Multiple Product | Yes |

The configuration of the scheduled refill product is performed according with the configuration in the CATALOGUE MAPPING in Table 1 to use the general fields to store in the billing system the input values defined during automatic refill activation.

The billing system 112 may be implemented in many ways. For example, the billing system 112 may include Convergys Geneva™ platform components which implement a rating engine, a billing engine, and account management. As another example, the billing system 112 may include Singl.eView™ platform components available from Intec Telecom Systems PLC of Surrey England. The Singl.eView™ components may implement a commerce engine, event normalization and rating processes, a balance and reservations management system, billing and invoicing generation processes, an accounting system, or other systems.

The automatic refill system 102 is also in communication with a network infrastructure 124. The network infrastructure 124 may include telecommunication entities such as telecommunication customers, telecommunication service providers, or any or now known or later occurring telecommunication entities. The automatic refill system 102 communicates with the network infrastructure 124 using messages. The automatic refill system 102 may implement one or more messaging adapters, such as messaging adapter 126, to communicate with the network infrastructure 124. Alternatively, the automatic refill system 102 may communicate with the network infrastructure 124 directly, such as through the billing system 112.

In communicating with the network infrastructure 124, the automatic refill system 102 may use a messaging adapter 126. The messaging adapter 126 determines whether a received message is in a format understandable by the automatic refill system 102. The messaging adapter 126 also converts one or more messages into a format expected by the automatic refill system 102. Alternatively, or in addition, the messaging adapter 126 may convert one or more messages into a format understandable by one or more systems implemented by the automatic refill system 102. For example, the messaging adapter 126 may convert messages into a format understandable by the revenue management system 104, the self care system 106, the customer relation management system 108, the pre-paid balance manager 110, the billing system 112, or any other system. The messaging adapter 126 can also convert messages sent from the automatic refill system 102 to a format understandable by the network infrastructure 124. Thus, the messaging adapter 126 helps to facilitate communication between the automatic refill system 102 and the network infrastructure 124.

In addition to the messaging adapter 126, the automatic refill system 102 may also implement a messaging adapter 118 for communications between the systems 102-112. The message adapter 118 facilitates communicating incoming messages 120 to the billing system 112 and communicating outgoing messages 122 from the billing system 112 to other systems.

In one implementation, the automatic refill system 102 implements a general message structure having a predetermined number of data fields. In this implementation, the billing system 112 may refer to one or more data fields. In another implementation, the messaging adapter 118 may be configured to retain only those data fields from the general message structure usable by the billing system 112. Alternatively, the general messaging structure may be in one protocol, whereas the billing system 112 expects a different protocol. In this implementation, the messaging adapter 118 may convert the general messaging protocol into a protocol understandable by the billing system 112. Hence, the messaging adapter 118 facilitates the conversion of the general messaging structure to a structure understandable by the billing system 112.

In yet another implementation, each of the systems implemented by the automatic refill system 102 may use different types of messaging structures. In this implementation, the messaging adapter 118 may use mapping from the messaging structures of each of the other systems to a messaging structure usable by the billing system 112. Thus, the messaging adapter 118 facilitates the transmission of incoming messages 120 and outgoing messages 122.

Alternatively, or in addition to, communicating with the network infrastructure 124 using messaging adapter 126, the automatic refill system 102 may communicate with the network infrastructure 124 without using a messaging adapter. In one implementation, the network infrastructure communicates with the automatic refill system 102 via billing system 112. In this implementation, the billing system receives a message from the network infrastructure 124 in an expected format. According to the data stored in the data fields of the message, the billing system 112 may route the message to a refill channel, such as the triggered refill channel 114 or the scheduled refill channel 116.

The messages and messaging adapters 118 and 126 may be implemented, for example, with TIBCO Adapters$^{SM}$ and TIBCO Rendezvous™ messaging, available from TIBCO Software Inc. of Palo Alto, Calif. In one implementation, the messages are extensible Markup Language (XML) messages and the adapters perform transformation according to extensible Stylesheet Language for Transformations (XSLT) stylesheets. The transformations may transform data between schemas for any of XML, Hypertext Transport Protocol (HTTP), Simple Object Access Protocol (SOAP), Web Service Definition Language (WSDL), extensible Scheme Diagram (XSD), Java Database Connectivity/Open Database Connectivity (JDBC/ODBC) or other message format, content standards, or communication protocols in place in the automatic refill system 102.

Customer accounts may be pre-paid accounts, post-paid accounts, or any other now known or later developed customer accounts. In general a pre-paid account is an account in which a customer has previously paid for service and a post-paid account is an account in which a customer is billed for service. A pre-paid customer account may be linked to a post-paid customer account such that payments made to the pre-paid customer account will appear as adjustments on the post-paid customer account.

Figure 2:
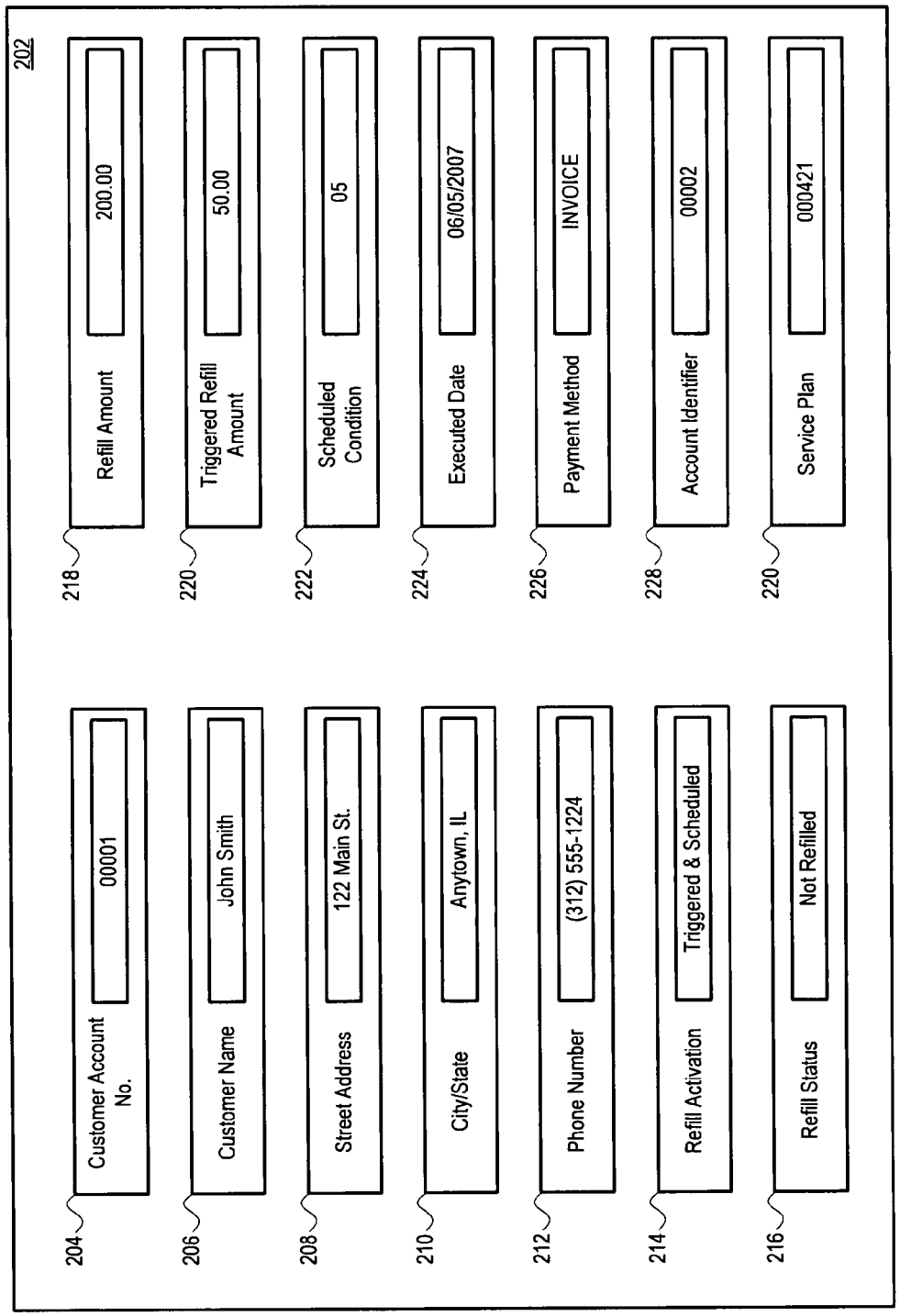
FIG. 2 shows an implementation of a pre-paid customer account configuration record.

FIG. 2 shows one implementation of a pre-paid customer account configuration record 202. The pre-paid customer account configuration record 202 includes one or more data fields 204-220. The pre-paid customer account configuration record 302 may be a table in a customer database, an electronic file organized in a file system, or any other now known or later developed record keeping electronic storage. The customer database, the customer file system, or combinations thereof, may be implemented in any of the systems of the automatic refill system 102 including, but not limited to, the revenue management system 104, the self care system 106, the customer relation management system 108, the pre-paid balance manager 110, or the billing system 112. The customer database may also be accessible by one or more systems of the automatic refill system 102 or by the network infrastructure 124.

The customer accounts may be linked with a configuration record using a customer account identifier. For example, the pre-paid customer account configuration record 202 has a customer account identifier data field 204. The customer account identifier data field 204 may store a customer identifier that identifies a customer account with its corresponding configuration record 202. The customer account identifier may be used by the automatic refill system 102 or any of the systems implemented by the automatic refill system 102.

Additional data fields are used to provide information regarding a pre-paid customer account. The pre-paid customer account configuration record 202 may have one or more customer information data fields 206-212. These data fields may include a customer name data field 206, a street address data field 208, a city/state data field 210, and a phone number data field 212. The street address data field 208 and the city/state data field 210 may correspond to a billing address or other address of the pre-paid customer account. The pre-paid customer account configuration record 202 may use the phone number data field 212 to store a contact number for the pre-paid customer. The pre-paid customer account configuration record 202 may also include additional contact information data fields, such as a data field for an e-mail address, a data field for an alternative phone number, or other such contact information.

The pre-paid customer account configuration record 202 may also include a refill activation data field 214 that stores an identifier identifying which of the refill channels implemented by the billing system 112 are activated for the pre-paid customer account. The refill activation identifier may identify whether only the triggered refill channel 114 is activated. The refill activation identifier may also identify whether only the scheduled refill channel 116 is activated. The refill activation identifier may further identify whether both the triggered refill channel 114 and the scheduled refill channel 116 are activated. Hence, a pre-paid customer account may be configured with the triggered refill channel 114, the scheduled refill channel 116, or both.

Another data field of the pre-paid customer account configuration record 202 is a refill status data field 216. The refill status data field 216 stores an identifier representative of a refill status. The refill status data field 216 may indicate whether a refill funding procedure was executed for the pre-paid customer account, whether a pre-paid customer account has been processed, or any other status information. For example, the refill status data field 216 may indicate that the triggered refill channel 114 performed a triggered refill funding procedure on the pre-paid customer account, or that the scheduled refill channel 116 performed a scheduled refill funding procedure on the pre-paid customer account, or combinations thereof. The refill status data field 216 may also indicate that the pre-paid customer account has been refilled. In this manner, the refill status data field 216 helps to distinguish those pre-paid customer accounts that have been refilled from those pre-paid customer accounts that have not been refilled.

The pre-paid customer account configuration record 202 also has a refill amount data field 218 that stores an identifier representative of a refill amount. The refill amount data field 218 may represent the amount by which an automatic refill channel uses to refill a pre-paid customer account. In another implementation, the refill amount data field 218 represents the amount to which the pre-paid account should be refilled. The refill amount data field 218 may store a variety of amounts, such as a monetary amount or a time amount. As an example of a monetary amount, the refill amount data field 218 may indicate that a pre-paid customer account should be refilled in $100.00 increments. Thus, the triggered refill channel 114, the scheduled refill channel 116, or both, would refill the pre-paid customer account by $100.00 increments during their corresponding refill funding procedures. As an example of a time amount, the refill amount data field 218 may indicate that a pre-paid customer account should be refill in increments of 120 minutes. Thus, the triggered refill channel 114, the scheduled refill channel 116, or both, would refill the pre-paid customer account by 120 minutes during their corresponding refill funding procedures.

A triggered refill amount data field 220 is also included in the pre-paid customer account configuration record 202. The triggered refill amount data field 220 stores a value representative of a triggered refill condition. In one implementation, the triggered refill amount data field 220 may store an amount representative of a predetermined threshold of a monetary value for a balance remaining in a pre-paid customer account. In this implementation, when the balance of the pre-paid customer account is less than the predetermined threshold, the triggered refill channel 114 may perform a triggered refill funding procedure on the pre-paid customer account. As one example, the triggered refill amount data field 220 may store a monetary amount in U.S. dollars, such as $250.00. In this example, the triggered refill channel 114 may perform a triggered refill funding procedure when the balance on the pre-paid customer account is $240.00. In another implementation, the triggered refill amount data field 220 may store a time amount represented in minutes, such as 120 minutes. In this implementation, the triggered refill channel 114 may perform a triggered refill funding procedure when the balance on the pre-paid customer account is 90 minutes. The triggered refill channel 114 may refer to the refill amount data field 218 to determine the amount in which to refill the pre-paid customer account. Furthermore, different pre-paid customer accounts may be configured with a different amount, a different type of amount, or both, for the triggered refill amount data field 220.

A scheduled condition data field 222 of the pre-paid customer account configuration record 202 stores a value representative of a regularly scheduled refill condition. A regularly scheduled refill condition may be a calendar date representative of when the scheduled refill channel 116 should execute a scheduled refill funding procedure to refill a pre-paid customer account. Thus, when the scheduled refill channel 116 determines that the current calendar date is equal to the regularly scheduled refill condition, the scheduled refill channel 116 may perform the scheduled refill funding procedure. The regularly scheduled refill condition may be represented in the format of DD where DD is a numerical representation of the day of the month represented. For example, the value shown in the scheduled condition data field 222 of "05" may represent that the scheduled refill channel 116 should execute the scheduled refill funding procedure on the fifth of every month. However, other calendar representations and other schedules are also possible.

The pre-paid customer account configuration record 202 also includes an executed date data field 224 that stores a value representative of a calendar date when the scheduled refill funding procedure was last executed by the scheduled refill channel 116. The calendar date may represent a day from the Gregorian calendar and represent that day in the format of MM/DD/YYYY, where MM is a numerical representation of a month, DD is a numerical representation of the day of the month represented by MM, and YYYY is a numerical representation of the year of the month and day, represented as MM and DD, respectively.

A payment method data field 226 stores an identifier representative of a payment type. For example, the payment method data field 226 may store an identifier representative of using an invoice method, such as by billing a post-paid account, for refilling the pre-paid customer account. Other payment methods are also possible, including credit card payments, debiting a checking or savings account, or other billing methods.

The pre-paid customer account configuration record 202 may further include an account identifier data field 228. In one implementation, the account identifier data field 228 stores an identifier representative of a configuration record for a post-paid account. Thus, when either the triggered refill channel 114 or the scheduled refill channel 116 performs a refill funding procedure, a post-paid account may be billed in a corresponding amount used to refill the pre-paid customer account. Alternatively, the account identifier data field 228 may include an identifier of an alternative account, such as a credit card account or a bank account for the pre-paid customer. However, it is also possible that the pre-paid customer account is configured with both a post-paid account and one or more alternative accounts.

Finally, the pre-paid customer account configuration record 202 may include a service plan data field 220. The service plan data field 220 may indicate the type of service configured for the pre-paid customer account, a service plan registered to the pre-paid customer account, the options of the service plan available to the pre-paid customer account, or any other now known or later developed service plan information.

Like a pre-paid customer account configuration record 202, a post-paid customer account configuration record may include one or more data fields previously discussed. However, a post-paid customer account configuration record may also include billing information data fields for billing a corresponding post-paid customer. For example, the post-paid customer account may include a billing address data field representative of the billing address for the post-paid customer. Other billing data fields are also possible, such as the type of invoices the post-paid customer account should receive. The configuration record for the post-paid account may also include one or more data fields that identify the pre-paid accounts linked to the post-paid account.

Figure 3:
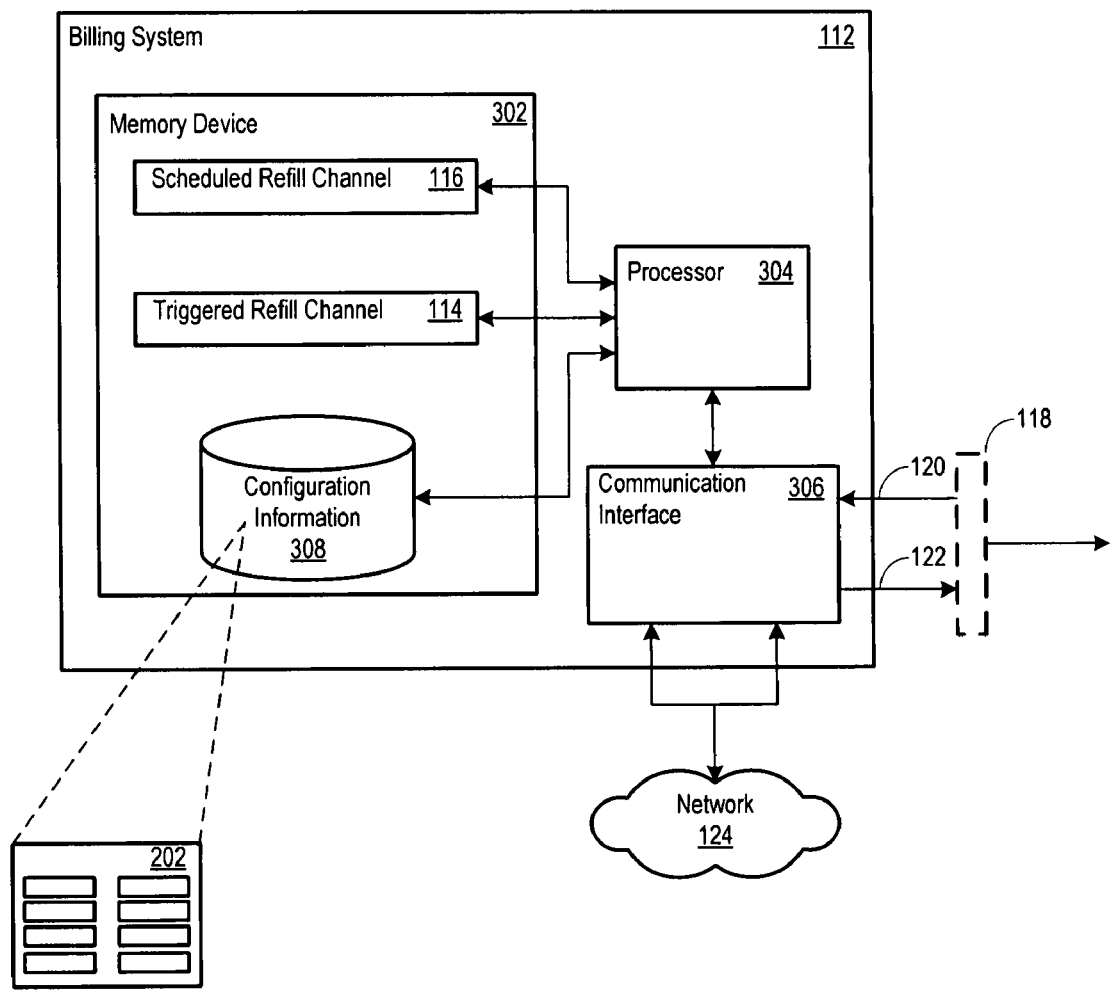
FIG. 3 shows an implementation of a billing system usable in the automatic refill system of FIG. 1.

FIG. 3 shows an implementation of a billing system 112 usable in the automatic refill system 102 of FIG. 1. In one implementation, the billing system 112 includes a memory device 302, a processor 304, and a communication interface 306. The memory device 302 is operable to implement the triggered refill channel 114 and the scheduled refill channel 116. The memory device 302 is further operable to retain configuration information 308 relating to one or more pre-paid account configuration records 202, one or more post-paid account configuration records, the triggered refill channel 114, the scheduled refill channel 116, or combinations thereof. The triggered refill channel 114, the scheduled refill channel 116, or the configuration information 308, may be implemented in hardware, software, or a combination of hardware and software.

In one implementation, the billing system is a customization of Singl.eView™ and the triggered refill channel 114 and the scheduled refill channel 116 are implemented to work with this customization. One or more automatic refill channel data fields are implemented as attributes of two products, a triggered refill product and a scheduled refill product, that one or more pre-paid customers have when the pre-paid customers subscribe to the triggered refill channel 114 or the scheduled refill channel 116. In this implementation, the triggered refill channel 114 is implemented using the Expression Parser Module (EPM) of Singl.eView™ and the code is integrated with code that performs the rating of each usage event. In other words, every time that an event is rated for a pre-paid account customer account, the triggered refill amount data field 220 of a corresponding pre-paid customer account configuration record is evaluated and if the threshold amount represented by the triggered refill amount data field 220 is breached, the pre-paid customer account is refilled. In contrast, the scheduled refill channel 116 may be implemented as a daily Singl.eView™ task that calls a Perl™ script. Hence, for each pre-paid customer account that have subscribed to the scheduled refill channel 116, this script then evaluates the scheduled condition field data field 222. Where the scheduled condition data field 222 contains the same day of the script execution date, the pre-paid customer account is refilled.

When the triggered refill channel 114 or the scheduled refill channel 116 are activated for a pre-paid customer account, the automatic refill channels may use a data structure, such as a table, to monitor the process of performing a refill funding procedure on the pre-paid customer account and reports automatic refill in error. The data structure may be configured as part of the configuration information 308. An example of a data structure used by either the triggered refill channel 114 or the scheduled refill channel 116 in performing a refill funding procedure is shown in Table 5.

TABLE 5

| Field Name | Description |
| --- | --- |
| EFFECTIVE_DATE | Date execution of the scheduled or triggered refill channel |
| AUTOMATIC_REFILL_TYPE | The type of refill channel configured for the pre-paid customer account. |
| REFILL_STATUS | Indicates whether the pre-paid customer account has been refilled. |
| REFILL_AMOUNT | The amount to refill the pre-paid customer account. |
| SCHEDULED_REFILL_DATE | The date on which to refill the pre-paid customer account. |
| TRIGGERED_REFILL_THRESHOLD | The threshold amount for a pre-paid customer account. |
| POST_PAID_ACCOUNT_NUM | The post-paid account used to refill the pre-paid customer account. |
| PRE_PAID_ACCOUNT_NUM | The identification of the pre-paid customer account. |
| PRE_PAID_PRODUCT_INSTANCE_ID | Internal identifier in the billing system to identify the instance of the triggered or scheduled refill product |
| ERROR_CODE | An error code indicating whether the refill of the pre-paid customer account was successful. |
| ERROR_DESCRIPTION | The description corresponding to the error code. |

Each of the fields of Table 5 may correspond to one or more data fields of the pre-paid customer account configuration record 202. For example, the EFFECTIVE_DATE field may correspond to the executed date data field 224, the AUTOMATIC_REFILL_TYPE field may correspond to the refill activation data field 214, the REFILL_STATUS field may correspond to the refill status data field 216, the REFILL_AMOUNT field may correspond to the refill amount data field 218, and so forth.

The types of data for the data fields shown in Table 5 are represented in Table 6 below.

TABLE 6

| Field Name | Description field |
| --- | --- |
| EFFECTIVE_DATE | DATE NOT NULL |
| AUTOMATIC_REFILL_TYPE | VARCHAR2(60) NOT NULL |
| REFILL_STATUS | NUMBER(2, 0) NOT NULL |
| REFILL_AMOUNT | VARCHAR2(15) NOT NULL |
| SCHEDULED_REFILL_DATE | VARCHAR2(2) NULL |
| TRIGGERED_REFILL_THRESHOLD | VARCHAR2(15) NULL |
| POST_PAID_ACCOUNT_NUM | VARCHAR2(30) NOT NULL |

TABLE 6-continued

| Field Name | Description field |
|---|---|
| PRE_PAID_ACCOUNT_NUM | VARCHAR2(30) NOT NULL |
| PRE_PAID_PRODUCT_INSTANCE_ID | VARCHAR2(15) NOT NULL |
| ERROR_CODE | VARCHAR2(7) NULL |
| ERROR_DESCRIPTION | VARCHAR2(4000) NULL |

The communication interface 306 facilitates communication between the billing system 112, the other systems of the automatic refill system 102, and the network 124. In one implementation, the communication interface 306 facilitates the communication of incoming messages 120 and outgoing messages 122 with the messaging adapter 118. For example, the communication interface 306 may direct incoming messages 120 to one or more of the components of the billing system 112, such as the memory device 302, the processor 304, the triggered refill channel 114, the scheduled refill channel 116, or any other components of the billing system 112. As another example, the communication interface 308 may direct outgoing messages 122, initially prepared by the billing system 112, to the messaging adapter 118 for one or more systems of the automatic refill system 102. The communication interface 306 may be implemented in hardware, software, or combinations thereof.

The processor 304 performs a variety of functions. In one implementation, the processor 304 executes the triggered refill channel 114 and the scheduled refill channel 116. The processor 304 may also process information received from one or more systems of the automatic refill system 102, the memory device 302, or the network 124 The processor 304 may also direct one or more messages to the triggered refill channel 114 or the scheduled refill channel 116. The processor 304 may be further configured to communicate configuration information 308 to or from the triggered refill channel 114 or the scheduled refill channel 116. The processor 304 may also facilitate a refill funding procedure when triggered refill channel 114 or the scheduled refill channel 116 executes a refill funding procedure on one or more pre-paid customer accounts.

Figure 4:
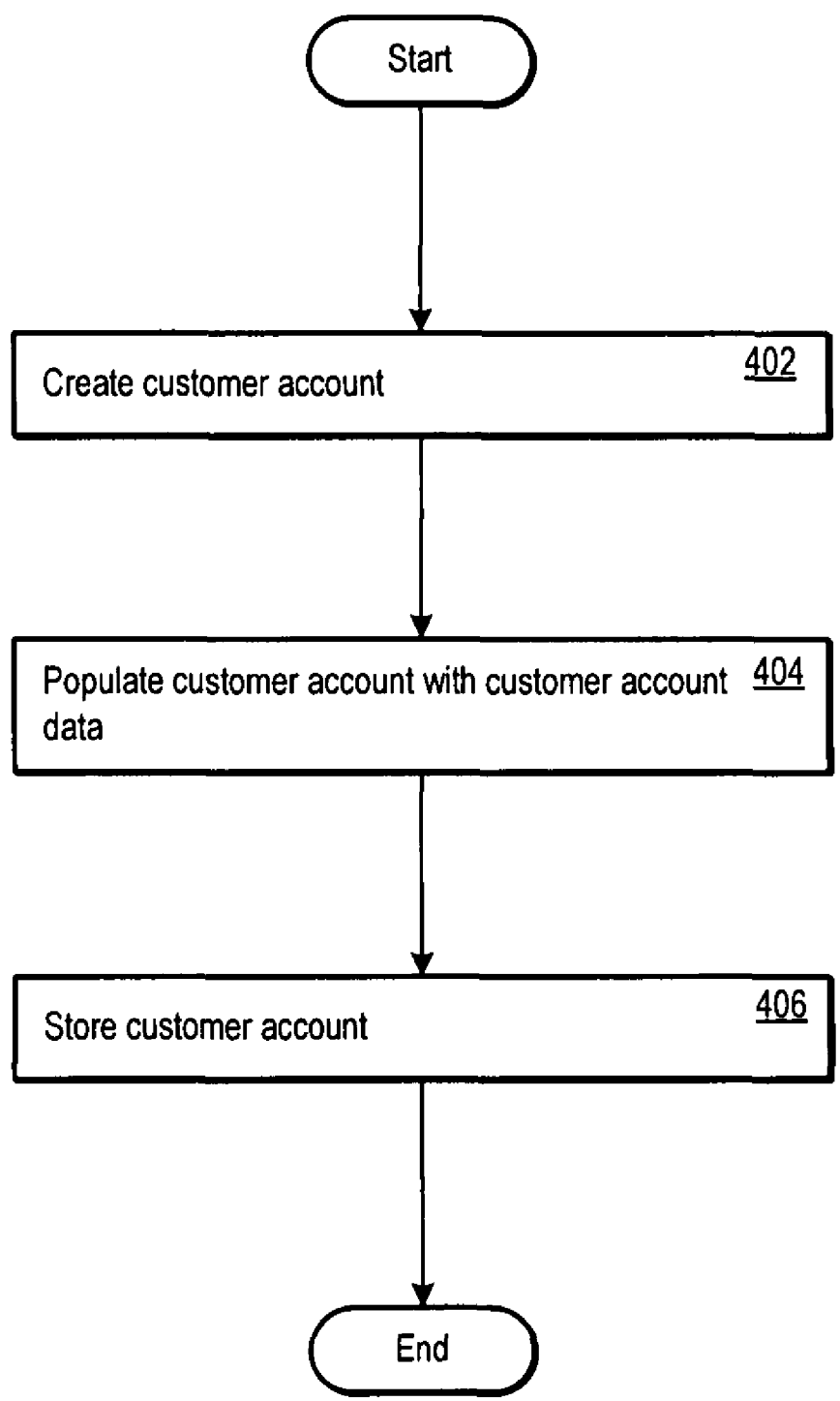
FIG. 4 shows processing flow for creating a customer account using the automatic refill system.

FIG. 4 shows processing flow for creating either a pre-paid customer account or a pre-paid customer account using the automatic refill system 102. In one implementation, the billing system 112 creates a customer account (402). The customer account is then populated with customer account data or information (404). The billing system 112 then stores the created customer account (406).

Figure 5:
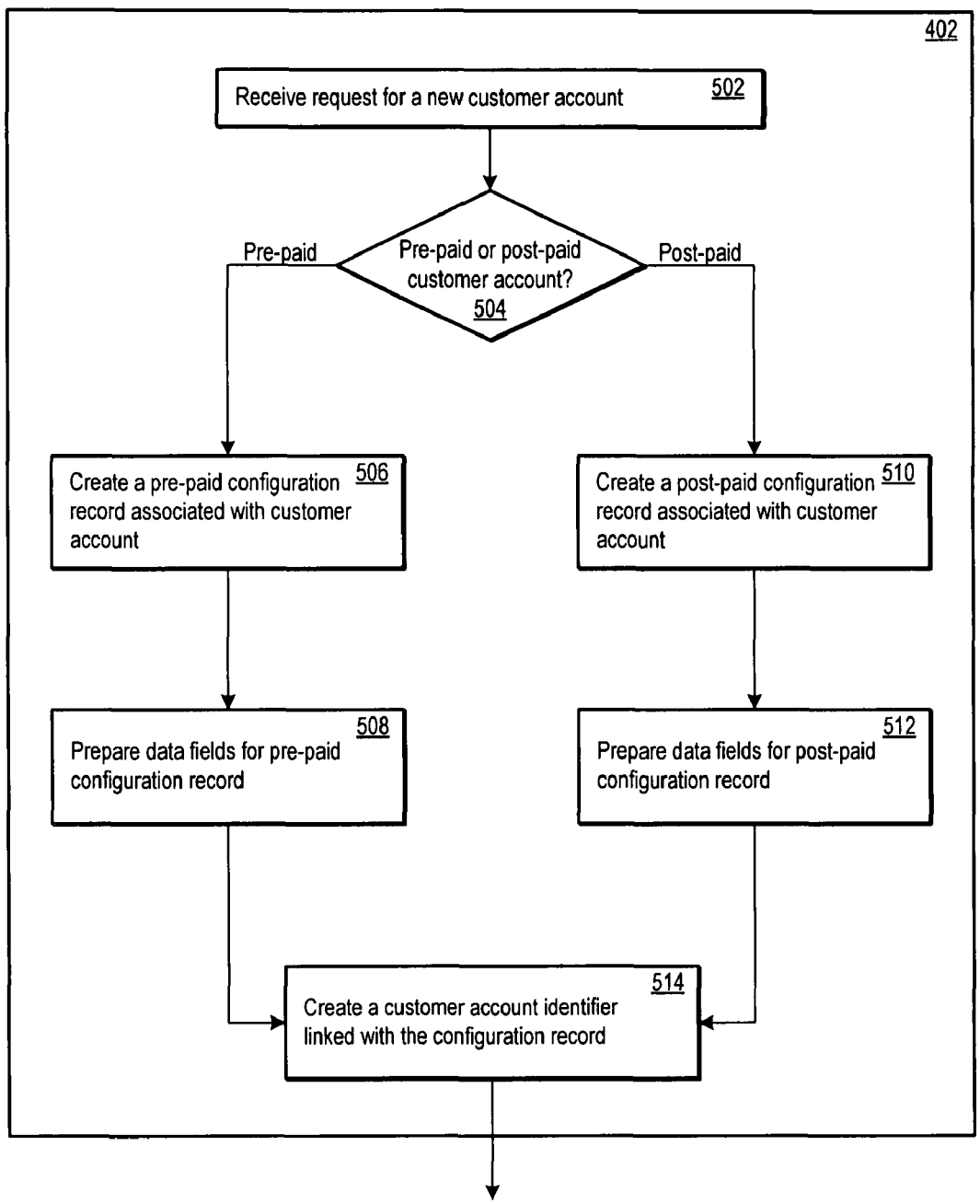
FIG. 5 shows processing flow of initial configuration actions for creating a customer account.

FIG. 5 shows processing flow of initial configuration actions for creating a customer account. In creating a customer account, the billing system 112 receives a request to create the customer account (502). The request to create the customer account may be in the format of a message. The billing system 112 then determines whether the request to create a customer account is a request to create a pre-paid customer account or a post-paid customer account (504). This determination may be made by inspecting one or more data fields that accompany the request to create the customer account. For example, the message accompanying the request to create a customer account may have a data field whose values may be text values chosen from "pre-paid" or "post-paid." Alternatively, the values may be numerical values chosen from "0" or "1," where "0" represents "pre-paid" and "1" represents "post-paid." Other types and combinations of values, alphanumeric, non-alphanumeric, or otherwise, are also possible.

Where the billing system 112 determines that the request to create a customer account is a request to create a pre-paid customer account, the branch labeled "Pre-paid" is followed. The billing system 112 may create a pre-paid customer account configuration record 202 associated with the pre-paid customer account (506). By way of example, one or more systems, such as the customer relation management system 108 may use a database for storing pre-paid customer account configuration records 202. The billing system 112 may also store the pre-paid customer account configuration record 202 as configuration information 308 as part of the memory device 302. Alternatively, the automatic refill system 102 may implement a file system for organizing one or more configuration records 202.

After the billing system 112 creates the pre-paid customer account configuration record 202 (506), the billing system 112 may then prepare one or more data fields for the pre-paid customer account configuration record 202 (508). Preparing one or more data fields may include, but is not limited to, creating one or more tables in a database, inserting one or more rows in a table, inserting one or more columns in a table, creating one or more data fields in one or more tables, assigning default values to one or more data fields for one or more tables, any other now known or later developed actions for preparing data fields, or combinations thereof.

Alternatively to creating a configuration record 202 for a pre-paid customer account, the billing system 112 may create a post-paid customer account configuration record by following the branch labeled "Post-paid." Where the request to create a customer account configuration record is for a post-paid customer account configuration record, the billing system 112 may initially create a configuration record for the post-paid customer account (510). By way of example, one or more systems, such as the customer relation management system 108 may use a database for storing configuration records of post-paid customer accounts. The billing system 112 may also store the post-paid customer account configuration record 202 as configuration information 308 as part of the memory device 302. Alternatively, the automatic refill system 102 may implement a file system for organizing one or more configuration records for post-paid accounts. Furthermore, the automatic refill system 102 may use the same method of organization, such as databases, file systems, or combinations thereof, for organizing configuration records of both pre-paid customer accounts and post-paid customer accounts.

The billing system 112 may then prepare one or more data fields for the configuration record of the post-paid account (512). Preparing one or more data fields may include, but is not limited to, creating one or more tables in a database, inserting one or more rows in a table, inserting one or more columns in a table, creating one or more data fields in one or more tables, assigning default values to one or more data fields for one or more tables, any other now known or later developed actions for preparing data fields, or combinations thereof. Preparing the data fields for a configuration record of a post-paid account may use none, some, or all of the same values as preparing the data fields for a configuration record of a pre-paid account. Similarly, preparing the data fields for a configuration record of a pre-paid account may use none, some, or all of the same values as preparing the data fields for a configuration record of a post-paid account.

When the configuration record has been created and the data fields have been prepared, the billing system 112 may then create a customer account identifier for the configuration record (514). One or more systems in communication with the billing system 112 may use or access the customer account identifier to access or modify the associated configuration record. Creating a customer identifier for a configuration record may include generating a series of alphanumeric character that uniquely identify the configuration record from other configuration records. Creating the customer identifier may also include using information regarding the customer, such as creating the customer identifier from a concatenation of the customer's first initial and last name. Alternatively, creating the customer identifier may include choosing a number from a predetermined sequence of numbers ("1, 2, 3, . . . "; "1, 3, 5, 7, . . . "), a predetermined sequence of letters, ("a, b, c, . . . "; "AA, AB, AC, . . . "), or combinations thereof. The customer identifier may also be created using information relating to the creation of the configuration record, such as the name of a table in a database. After creating the customer identifier, the billing system 112 then proceeds to populate the configuration record with customer account data or information (402).

Figure 6:
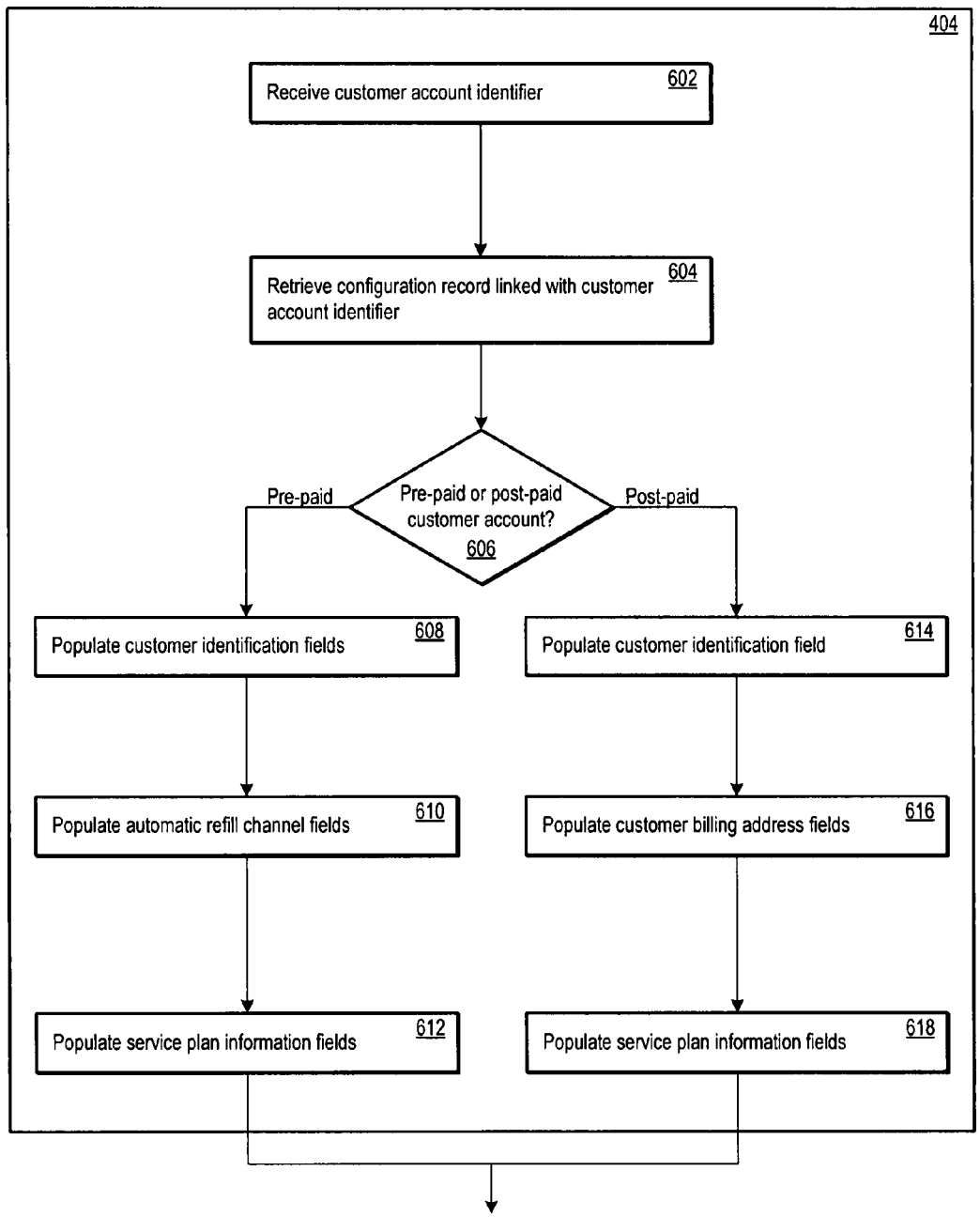
FIG. 6 shows processing flow for populating a configuration record of a customer account based on whether the customer account is a pre-paid account or a post-paid account.

FIG. 6 shows processing flow for populating a configuration record of a customer account based on whether the customer account is a pre-paid account or a post-paid account. As used herein, the term "populating" may include importing prepared data into a database from a file using a software procedure, using a human operator to enter data into a database, importing prepared data into a computer file system, using a human operator to enter data into a computer file system, any other known or later developed methods for entering data into a computer system, or combinations thereof. One or more systems of the automatic refill system 102 may handle populating a configuration record with data. For example, the customer relation management system 108 may be configured to handle this task. Alternatively, the billing system 112 may be configured to handle populating a configuration record with data. However, there may also be one or more systems in communication with the automatic refill system 102 that handles populating a configuration record with data. In any of the implementations previously mentioned, the system receives a customer account identifier previously established for the configuration record (602). Receiving the customer account identifier may or may not be in response to a request for the customer account identifier.

Using the customer account identifier, the billing system 112 then retrieves the corresponding configuration record (604). For example, the billing system 112, may retrieve the configuration record from the configuration information 308 using the customer account identifier as part of a query to the database. The billing system 112 then determines whether the request to create the customer account is a request to create a pre-paid customer account or a post-paid customer account. The automatic billing system 112 may make this determination by inspecting one or more data fields accompanying the request to create the customer account, by inspecting one or more data fields of the configuration record, or combinations thereof. Inspecting one or more data fields may include comparing one or more data fields with predetermined values for a pre-paid customer account and for a post-paid customer account. As previously mentioned, a data field may have a text value chosen from "pre-paid" or "post-paid." Alternatively, a data field may have a numerical value chosen from "0" or "1," where "0" represents "pre-paid" and "1" represents "post-paid."

Where the billing system 112 determines the request to create a customer account is for creating a pre-paid customer account, the billing system 112 follows the actions along the branch labeled "Pre-paid." Initially, the billing system 112 may populate one or more customer identification data fields 204-212 (608). Customer identification may include, but is not limited to, demographic information, personal information, address information, contact information, any other types of information, or combinations thereof. For example, customer identification may include a customer's name, a customer's home address, a customer's home phone number, and a customer's e-mail address. Additional customer identification fields are also possible.

The billing system 112 may then populate one or more refill channel data fields 214-228 for the configuration record (610). Populating one or more refill channel data fields 214-228 are explained below with reference to FIG. 7.

The billing system 112 may then populate one or more service plan information data fields for the configuration record 202 (612). Service plan information may include, but is not limited to: the types of service to which the customer is subscribed; the initial balance, monetary, time, or otherwise, on the pre-paid customer account; the policy number of the one or more service plans to which the customer is subscribed; any other service plan information now known or later developed; or, combinations thereof.

Alternatively to populating data fields 204-220 for a pre-paid customer account, the billing system 112 may populate data fields for a post-paid customer account. Where the billing system 112 determines the request to create a customer account is for creating a post-paid customer account, the billing system 112 follows the actions along the branch labeled "Post-paid." In one implementation, the billing system 112 may initially populate one or more post-paid customer identification data fields (614). Post-paid customer identification may include, but is not limited to, demographic information, personal information, address information, contact information, any other types of information, or combinations thereof. For example, post-paid customer identification may include a customer's name, a customer's home address, a customer's home phone number, and a customer's e-mail address. Additional customer identification data fields are also possible. In one implementation, post-paid customer identification data fields may be the same type of data fields as pre-paid customer identification data fields. In another implementation, the billing system 112 may use data from pre-paid customer identification data fields to populate post-paid customer identification data fields.

The billing system 112 may then populate billing address data fields for the configuration record (616). Billing address information may include, but is not limited to, street address, city address, state of incorporation, geographical location, any other now known or later developed method of identifying geographical location, or combinations thereof. Billing address data fields may also include data from one or more post-paid customer accounts, one or more pre-paid customer accounts, or combinations thereof.

The billing system 112 may then populate one or more service plan information data fields for the configuration record (618). For a post-paid customer account, service plan information may include, but is not limited to: the types of service to which the post-paid customer is subscribed; the initial balance, monetary, time, or otherwise, on the post-paid customer account; the policy number of the one or more service plans to which the post-paid customer is subscribed; the pre-paid customer accounts linked with the post-paid customer account; any other service plan information now known or later developed; or, combinations thereof.

Figure 7:
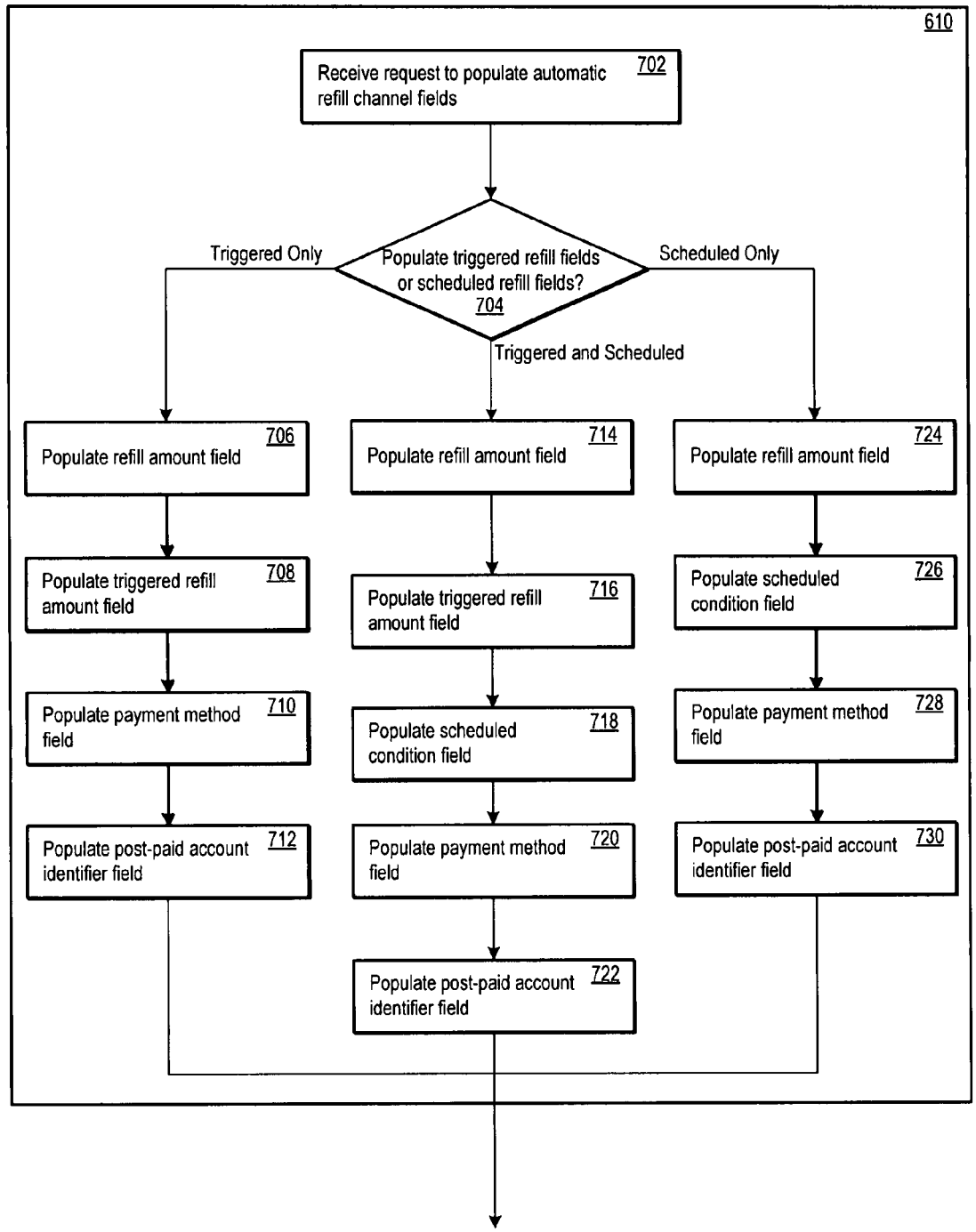
FIG. 7 shows processing flow for populating refill channel data fields of a configuration record.

FIG. 7 shows processing flow for populating refill channel data fields 214-228 of a configuration record 202 for a pre-paid customer account. Populating refill channel data fields 214-228 may be performed by one or more systems of the automatic refill system 102 such as the billing system 112. In one implementation, the billing system 112 uses the triggered refill channel 114, the scheduled refill channel 116, or combinations thereof, to populate one or more refill channel data fields 214-228. For example, the triggered refill channel 114, the scheduled refill channel 116, or combinations thereof, may communicate with the processor 304 to access data from the configuration information 308.

As an initial matter, the billing system 112 may receive a request to populate one or more automatic refill channel data fields 214-228 for a pre-paid customer account configuration record 202 (702). For example, the billing system 112 may receive a request as part of a message to populate refill channel data fields 214-228 from the customer relation management system 108, the pre-paid balance manager 110, or combinations thereof. The billing system 112 may then determine whether to populate only triggered refill channel data fields, only scheduled refill channel data fields, or both triggered refill channel data fields and scheduled refill channel data fields (704).

In determining which refill channel data fields 214-228 to populate, the billing system 112 may inspect a refill activation data field 214 of the pre-paid customer account configuration record 202. As previously discussed above, a refill activation data field 214 may store an identifier identifying whether only the triggered refill channel 114 is activated, only the scheduled refill channel 116 is activated, or the triggered refill channel 114 and the scheduled refill channel 116 are activated. In one implementation, the refill activation data field 214 may be populated with a default value, such as to indicate to activate only the triggered refill channel 114 for the customer account. In another implementation, a customer, pre-paid or post-paid, may choose whether to activate one or more refill channels on the pre-paid customer account. In yet a further implementation, the refill activation data field 214 may be populated automatically based on one or more data fields of a post-paid customer account linked with the pre-paid customer account.

Where the billing system 112 determines that the identifier of the refill activation data field 214 is to activate only the triggered refill channel 114 for the customer account, the billing system 112 follows one or more actions along the branch labeled "Triggered Only." In one implementation, the billing system 112 may execute the triggered refill channel 114 to populate one or more triggered refill channel data fields. In populating the refill channel data fields for only the triggered refill channel 114, the triggered refill channel 114 may populate a refill amount data field 218 (706), a triggered refill amount data field 220 (708), a payment method data field (710), and a post-paid account identifier data field (712).

In one implementation, the refill amount data field 218 represents the amount by which the triggered refill channel 114 uses to refill a pre-paid customer account when the triggered refill channel 114 executes a triggered refill funding procedure. In another implementation, the refill amount data field 218 represents the amount to which the pre-paid account should be refilled. The refill amount data field 218 may in any measureable amount, including, but not limited to, money, time, or combinations thereof. By way of example only, the refill amount data field 218 may be expressed as "$60.00" or "120 minutes."

In one implementation, the triggered refill amount data 220 field represents a predetermined threshold amount the triggered refill channel 114 may use to determine when to execute a triggered refill funding procedure. The triggered refill amount data field 220 may also represent a predetermined threshold of an amount representative of a monetary value for a balance remaining in a customer account. The triggered refill amount data field 220 may also represent a threshold time value. The triggered refill amount data field 220 may further represent a balance remaining on a pre-paid customer account, charges accrued by a pre-paid customer account, or combinations thereof.

The payment method data field 226 may store an identifier representative of the type of method the triggered refill channel 114 uses to refill the pre-paid customer account. For example, the payment method data field 226 may store an identifier representative of using an invoice method, such as by billing a post-paid account, for refilling the pre-paid customer account. Alternatively, the payment method data field 226 may store an identifier representative of using a credit method, such as by billing a credit card account, for refilling the pre-paid customer account. The payment method data field 226 may also store one or more identifiers representative of one or more payment methods.

The post-paid account data field 228 may store an identifier representative of a post-paid customer account linked to the pre-paid customer account that the triggered refill channel 114 uses to refill the pre-paid customer account. For example, the identifier may be a post-paid account identifier previously created by the automatic refill system 102. In another implementation, the post-paid account data field 228 may store an identifier representative of another number, such as a credit card number, a debit card number, an external bank account, or combinations thereof. The triggered refill channel 114 may then refer to the post-paid account data field 228 to determine the post-paid account or other account to bill when the triggered refill channel 114 refills the pre-paid customer account.

Although the pre-paid customer account may be configured for the triggered refill channel 114, it is also possible that the billing system 112 configures the pre-paid customer account for only the scheduled refill channel 116. Where the billing system 112 determines that the identifier of the refill activation data field 214 is to activate only the scheduled refill channel 116 for the pre-paid customer account, the billing system 112 follows one or more actions along the branch labeled "Scheduled Only." In one implementation, the billing system 112 may execute the scheduled refill channel 116 to populate one or more scheduled refill channel data fields. In populating the refill channel data fields for only the scheduled refill channel 116, the scheduled refill channel 116 may populate a refill amount data field 218 (724), a scheduled condition data field 222 (726), a payment method data field 226 (728), and a post-paid account identifier data field 228 (730). The refill amount data field 218, the payment method data field 226, the post-paid account identifier data field 228, or combinations thereof, may store types of data similar or identical the types of data used by one or more triggered refill channel data fields.

In contrast to the triggered refill channel 114, the scheduled refill channel 116 populates a scheduled condition data field 222. In one implementation, the scheduled condition data field 222 is operable to store a calendar date representative of the regularly scheduled refill condition. As previously discussed above, the regularly scheduled refill condition may be met when the scheduled refill channel 116 determines that the current calendar date is equal to a predetermined calendar date for the pre-paid customer account. As the scheduled refill channel 116 may be configured to execute on a daily basis, the scheduled refill channel 116 may execute a scheduled refill funding procedure where the current calendar date is equal to the date stored by the scheduled condition data field 222. In other implementations, the scheduled refill channel 116 may be configured to run more often, such as once an hour or once a minute, or less often, such as once a month or on a bi-weekly basis. Other schedules for executing the scheduled refill channel 116 are also possible.

The billing system 112 may further determine that both the triggered refill channel 114 and the scheduled refill channel 116 are to be activated for the pre-paid customer account. Where the billing system 112 determines that the identifier of the refill activation data field 214 is to activate both the triggered refill channel 114 and the scheduled refill channel 116 for the pre-paid customer account, the billing system 112 follows one or more actions along the branch labeled "Triggered and Scheduled." These actions may include executing both the triggered refill channel 114 and the scheduled refill channel 116. These actions may also include populating a refill amount field 218 (714), populating a triggered refill amount data field 220 (716), populating a scheduled condition data field 222 (718), populating a payment method data field 226 (720), populating a post-paid account identifier data field 228 (722), or combinations thereof. These data fields may be similar or identical to the data fields previously described for the triggered refill channel 114, the scheduled refill channel 116, or combinations thereof.

The billing system 112 may use one or more messages to populate the data fields of the pre-paid customer account. In one implementation, the messages are SOAP messages. An example of a SOAP message used to populate the data fields 204-220 of a pre-paid customer account configuration record 202 configured for the triggered refill channel 114 is shown below:

```
<SOAP-ENV:Body>
<m:serviceOrder2 xmlns:m="urn:xml-soapadapter">
    <m:organizationCode><organizationCode></m:organizationCode>
    <m:billingAccountId><billingAccountId></m:billingAccountId>
        <m:product>
            <m:rootInstanceId><rootInstanceId></m:rootInstanceId>
            <m:parentInstanceId><rootInstanceId></m:parentInstanceId>
            <m:productInstanceId><productInstanceId></
            m:productInstanceId>
            <m:actionCode>Add</m:actionCode>
            <m:productCatalogId><productCatalogId></
            m:productCatalogId>
            <m:serviceId></m:serviceId>
            <m:tariffId>1</m:tariffId>
            <m:startDate><startDate></m:startDate>
            <m:modifyDate></m:modifyDate>
            <m:endDate></m:endDate>
            <m:listOfAttributes>
                <m:attribute>
                    <m:actionCode>Add</m:actionCode>
                    <m:name>RefillAmount</m:name>
                    <m:value><RefillAmount></m:value>
                </m:attribute>
                <m:attribute>
                    <m:actionCode>Add</m:actionCode>
                    <m:name>RefillThreshold</m:name>
                    <m:value><RefillThreshold></m:value>
                </m:attribute>
                <m:attribute>
                    <m:actionCode>Add</m:actionCode>
                    <m:name>PaymentMethod</m:name>
                    <m:value><PaymentMethod></m:value>
                </m:attribute>
                <m:attribute>
                    <m:actionCode>Add</m:actionCode>
                    <m:name>PostPaidAccountNumber</m:name>
                    <m:value><PostPaidAccountNumber></m:value>
                </m:attribute>
            </m:listOfAttributes>
        </m:product>
</m:serviceOrder2>
</SOAP-ENV:Body>
```

Similarly, the billing system 112 may use a SOAP message to populate the data fields 204-220 of a customer account configuration record 202 configured for the scheduled refill channel 116. One implementation of a SOAP message used to populate the data fields 204-220 of a customer account configuration record 202 configured for the scheduled refill channel 116 is shown below:

```
<SOAP-ENV:Body>
<m:serviceOrder2 xmlns:m="urn:xml-soapadapter">
    <m:organizationCode><organizationCode></m:organizationCode>
    <m:billingAccountId><billingAccountId></m:billingAccountId>
        <m:product>
            <m:rootInstanceId><rootInstanceId></m:rootInstanceId>
            <m:parentInstanceId><rootInstanceId></m:parentInstanceId>
            <m:productInstanceId><productInstanceId></
            m:productInstanceId>
            <m:actionCode>Add</m:actionCode>
            <m:productCatalogId><productCatalogId></
            m:productCatalogId>
            <m:serviceId></m:serviceId>
            <m:tariffId>1</m:tariffId>
            <m:startDate><startDate></m:startDate>
            <m:modifyDate></m:modifyDate>
            <m:endDate></m:endDate>
            <m:listOfAttributes>
                <m:attribute>
                    <m:actionCode>Add</m:actionCode>
                    <m:name>RefillAmount</m:name>
                    <m:value><RefillAmount></m:value>
                </m:attribute>
                <m:attribute>
                    <m:actionCode>Add</m:actionCode>
                    <m:name>RefillDate</m:name>
                    <m:value><RefillDate></m:value>
                </m:attribute>
                <m:attribute>
                    <m:actionCode>Add</m:actionCode>
                    <m:name>PaymentMethod</m:name>
                    <m:value><PaymentMethod></m:value>
                </m:attribute>
                <m:attribute>
                    <m:actionCode>Add</m:actionCode>
                    <m:name>PostPaidAccountNumber</m:name>
                    <m:value><PostPaidAccountNumber></m:value>
                </m:attribute>
            </m:listOfAttributes>
        </m:product>
</m:serviceOrder2>
</SOAP-ENV:Body>
```

Referring back to FIG. 4, the billing system 112 then stores the created customer account (406). Storing the created customer account may include using one or more systems of the automatic refill system 102. For example, the customer relation management system 108 may store the configuration record for the created customer account in a database in communication with the customer relation management system 108. Alternatively, the billing system 112 may store the configuration record for the created customer account in the memory device 302 as part of the configuration information 308. A system external to the automatic refill system 102 may also store the configuration record for the created customer account.

In addition to creating a pre-paid customer account or a post-paid customer account, the billing system 112 may further modify or remove one or more pre-paid customer accounts or post-paid customer accounts. For example, the billing system 112 or the pre-paid customer may modify one or more data fields 204-220 of the pre-paid customer account configuration record 202. Modifications include suspending the triggered refill channel 114 or the scheduled refill channel 116 from acting on the pre-paid customer account, resuming the triggered refill channel 114 or the scheduled refill channel 116 configured for the pre-paid customer account, deleting a subscription by the pre-paid customer account to either of the automatic refill channels, or updating one or more data fields of the pre-paid customer account configuration records. Modifications may be communicated using messages passed between components of the billing system 112, or from the billing system 112 to other systems 100-110. In one implementation, the messages communicated are SOAP messages.

For example, a customer may use the self care system 106 to access the billing system 112 and thereby modify the customer's pre-paid customer account. Alternatively, other systems, such as the pre-paid balance manager 110 may also access the billing system 112 to modify one or more data fields of the pre-paid or post-paid customer account. Systems external to the automatic refill system 102 may also have access to modify the pre-paid or post-paid customer accounts.

Figure 8:
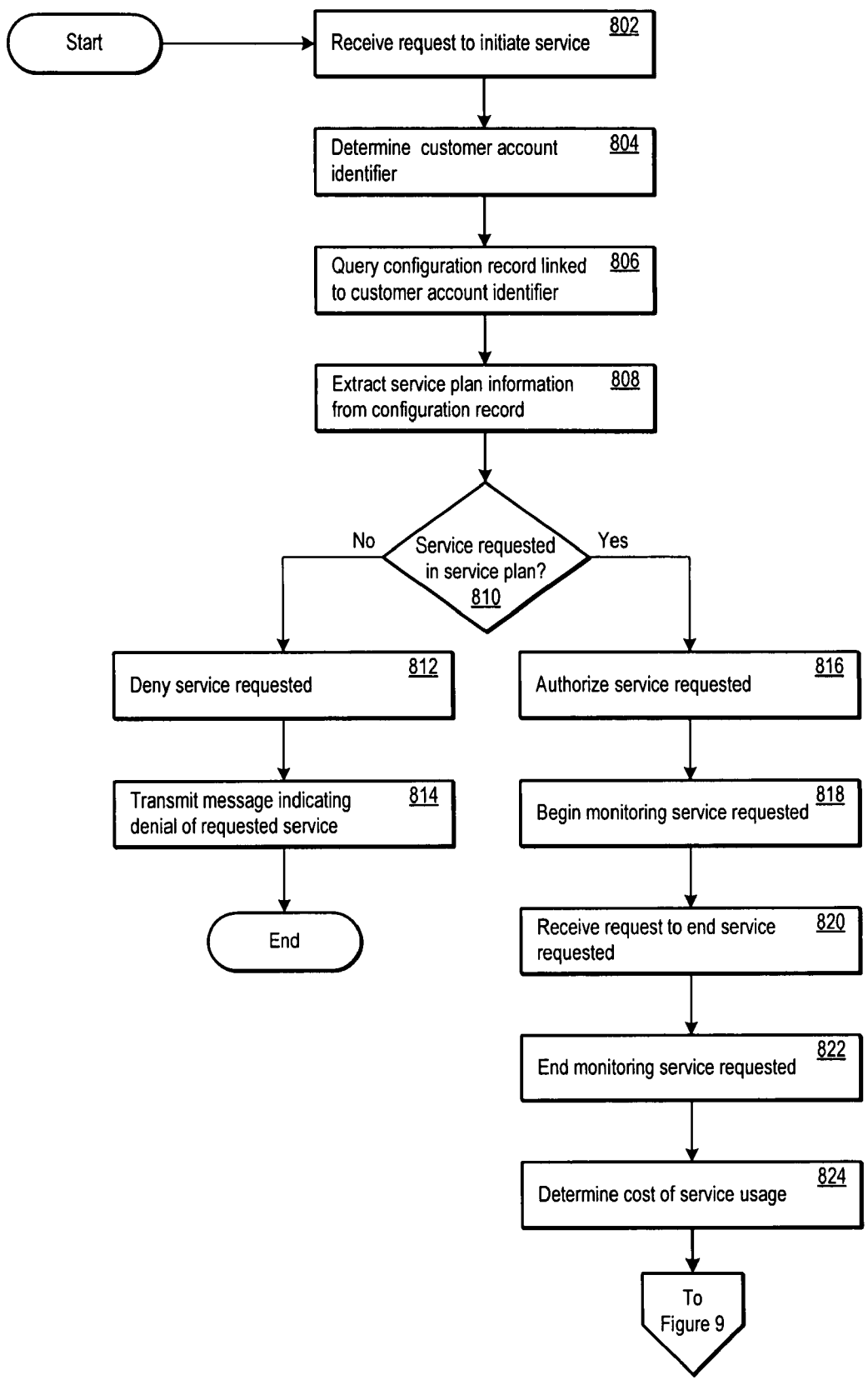
FIG. 8 shows processing flow for tracking a telecommunication service used by a customer.

FIG. 8 shows processing flow for tracking a telecommunication service used by a customer. In one implementation, the service tracking system 100 receives a request to initiate service (802). The service tracking system 100 may receive the request from the network 124 through the messaging adapter 126. Alternatively, the billing system 112 may receive the request from the network 124 through the communication interface 306. Other systems may also receive the request, such as the customer relation management system 106, the pre-paid balance manager 110, any other system in communication with the automatic refill system 102, or combinations thereof.

The service tracking system 100 or any other system that received the request to initiate service, then determines the customer account identifier associated with the request (804). This may include, for example, extracting one or more data fields from the message used to send the request.

The service tracking system 100 then queries the configuration record 202 linked to the customer account identifier (806). In one implementation, service tracking system 100 communicates with the billing system 112 to query the configuration record 202 stored in the configuration information 308. Alternatively, the billing system 112, or any other system, may query a database where the configuration record 202 is stored using the customer account identifier.

In querying the configuration record 202 linked with the customer account, the service tracking system 100 extracts the service plan information from the configuration record 202 (808). The service tracking system 100 then examines one or more data fields associated with the service plan information to determine whether the requested service is in the service plan associated with the customer account (810). This determination may also be performed by one or more systems 100-112, such as the self care system 16, customer relation management system 108, the pre-paid balance manager 110, the billing system 112, or combinations thereof.

Where the service tracking system 100 determines that the service requested by the request to initiate service is not in the service plan for the associated customer account, the service tracking system 100 denies the request to initiate service (812). The service tracking system 100 then transmits a denial message to the customer requesting the service that indicates a denial of the requested service (814). Preconfigured messages may be created to provide an explanation to the customer the reason why the requested service was denied.

Conversely, the service tracking system 100 may determine that the requested service is in the service plan of the customer account. In this circumstance, service tracking system 100 authorizes the service requested (816) and begins monitoring the usage of the service requested (818). Monitoring the service requested may include real-time tracking of the service requested at predetermined time intervals, such as on every second, or may include tracking the overall usage of the service, such as by comparing the starting time of the requested service with the ending time of the requested service.

After a period of time, the customer that initially requested the service may finish using the requested service. The service tracking system 100 may then receive a request to end the service requested (820). When the service tracking system 100 receives the request to end the service requested, the service tracking system 100 ends the monitoring of the service requested (822).

The service tracking system 100 may then communicate with one or more systems 102-112 to determine the cost of the service usage (824). In a real-time system, the cost of the service usage may be calculated at a predetermined time interval, such as every second, so that when the service tracking system 100 receives the request to end service, the systems 100-112 have already calculated the cost of the service usage by the customer. Alternatively, the systems 100-112 may calculate the cost of the service usage by the customer after the request to end service is received. For example, the service tracking system 100 may compare the starting time of the service with the ending time of the service to determine the total cost of the service used. The cost of the service used by the customer may be measured as a monetary amount, such as dollars, or in an amount of time, such as minutes or seconds.

As an example of a real-time system, suppose that the service tracking system 100 begins monitoring the service the customer requested at 12:00 P.M., and the service tracking system 100 is configured to monitor and determine the cost of the service usage every second. Thus, for every second after 12:00 P.M. the service tracking system 100 has calculated the cost of the service usage. For example, at 12:03 P.M., the service tracking system 100 has calculated the cost of the service usage for 180 seconds. Thus, when the service tracking system 100 receives the request to end service, the service tracking system 100 knows the cost of the service usage up until that time.

As an example of a non real-time system, suppose that the service tracking system 100 begins monitoring the service the customer requested at 12:00 P.M., and the service tracking system 100 is configured to determine the cost of the service usage after the request to end service is received. In this manner, the service tracking system 100 calculates the cost of the service usage after the service has been provided. Thus, when the service tracking system 100 receives a request to end service at 12:03 P.M., the service tracking system 100 at that point calculates that the customer has used 180 seconds of service.

Although the service tracking system 100 may maintain the cost of the service usage in terms of time, a conversion factor may be used to compute the cost of the service usage. For example, the service tracking system 100 may use a conversion of $0.02 per second to determine the monetary cost of the service usage. The service tracking system 100 may also use tariffs in computing the cost of the service usage. Furthermore, different types of service may have different types of service. Other methods for determining cost are also possible.

Figure 9:
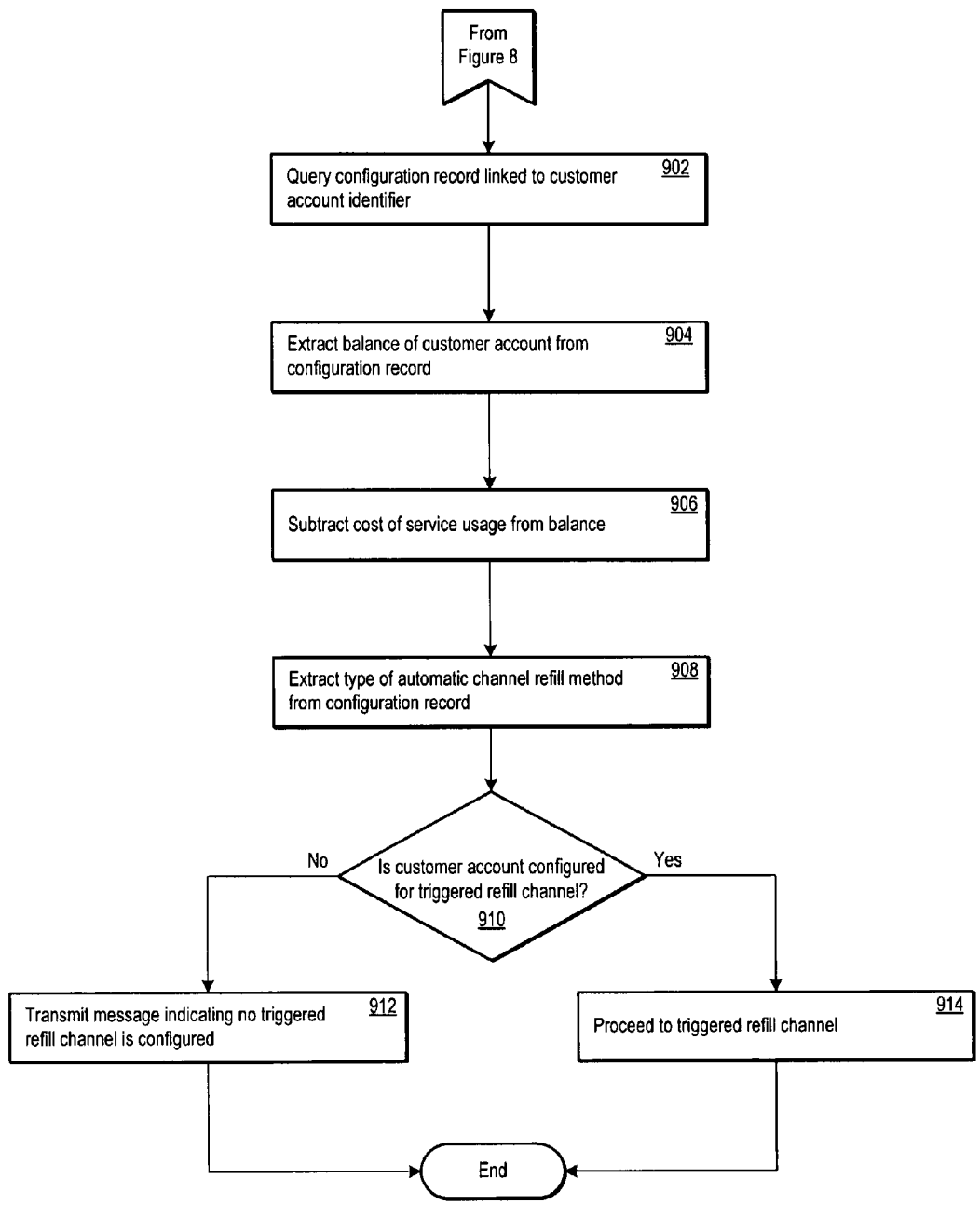
FIG. 9 shows processing flow for billing the customer of FIG. 8 and invoking a triggered refill channel for the corresponding customer account.

Referring to FIG. 9, after the systems 100-112 determine the cost of the service usage by the customer (824), one or more systems 100-112 query the configuration record 202 linked to the customer account using the previously received customer account identifier (902). In one implementation, the billing system 112 queries the configuration record 202 linked to the customer account. The billing system 112 may then extract the balance of for the customer account from the configuration record 202 (904). For example, the billing system 112 may use the processor 304 in conjunction with the communication interface 306 to determine the balance data of the configuration record 202. After extracting the balance data from the configuration record 202, the billing system 112 then applies the determined cost of the service usage to the balance (906). Applying the determined cost of the service usage to the balance of the configuration record 202 may include incrementing the balance of the configuration record, decrementing the balance of the configuration record 202, any other method of altering the balance to reflect the cost of the service usage, or combinations thereof.

The billing system 112 may then extract the type of automatic refill channel method from the configuration record 202 (908). As previously discussed, the configuration record 202 may have a data field 214 indicating that only the triggered refill channel 114 is activated, that only the scheduled refill channel 116 is activated, or that when both the triggered refill channel 114 and the scheduled refill channel 116 are activated. By analyzing this data field 214 the billing system 112 may determine whether the triggered refill channel 114 is activated for the customer account (910).

If the billing system 112 determines that triggered refill channel 114 is not activated, the billing system 112 may transmit a telecommunication record indicating that the triggered refill channel 114 is not activated on the customer account (912). This message may be transmitted to one or more systems, such as the customer relation management system 108, to record this fact in a log or other data repository, such as a database or file. Alternatively, the billing system 112 may not transmit a message.

On the other hand, the billing system 112 may determine that the triggered refill channel 114 is activated on the customer account. In this situation, the billing system 112 proceeds to activate the triggered refill channel 114 to automatically refill the customer account (914).

Figure 10:
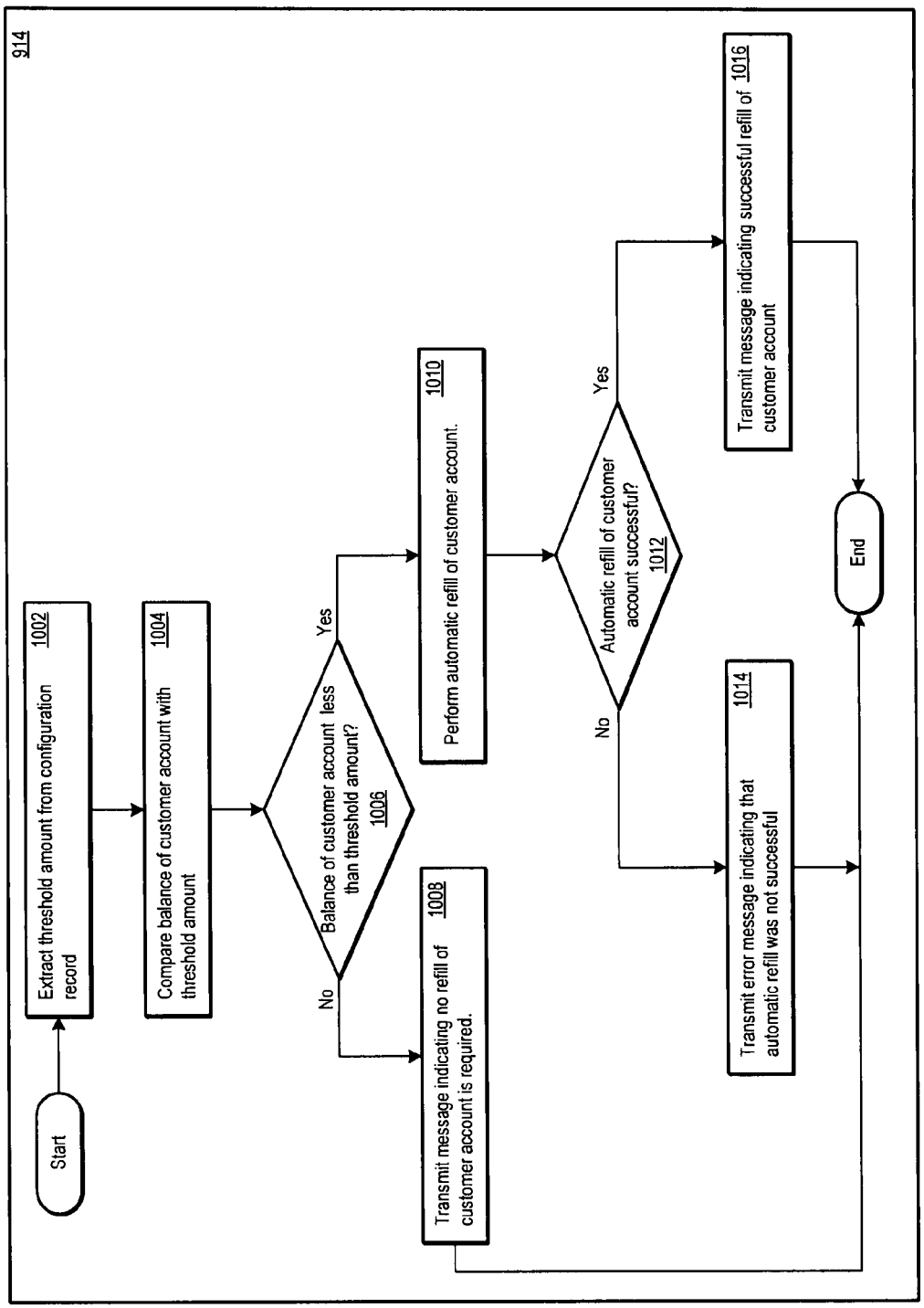
FIG. 10 shows processing flow of performing an automatic refill of a customer account using the triggered refill channel of FIG. 9.

FIG. 10 shows processing flow for performing an automatic refill of a pre-paid customer account using the triggered refill channel of FIG. 9. In one implementation when the triggered refill channel 114 is activated, the triggered refill channel 114 initially extracts the predetermined threshold amount of the pre-paid customer account from the triggered refill amount data field 220 of the configuration record 202 (1002). The triggered refill channel 114 then compares the extracted balance of the pre-paid customer account with the extracted predetermined threshold amount to determine whether a triggered refill condition is met (1004). In one implementation, the triggered refill condition is where the balance of the pre-paid customer account is less than the predetermined threshold amount. In this implementation, the triggered refill channel 114 determines whether the balance of the pre-paid customer account is less than the predetermined threshold amount (1006). In another implementation, the triggered refill condition may be met where the balance of the pre-paid customer account is greater than the predetermined threshold amount.

In one situation, the triggered refill channel 114 may determine that the triggered refill condition was not met. In this situation, the triggered refill channel 114 may transmit a message to indicate that the refill of the pre-paid customer account is not required (1008). This message may be transmitted to one or more systems, such as the revenue management system 104, the self care system 106, the customer relation management system 108, the pre-paid balance manager 110, or combinations thereof. The triggered refill channel 114 may also send the message to one or more external systems in communication with the automatic refill system 102, such as through network 124.

In another situation, the triggered refill channel 114 may determine that the triggered refill condition is met and execute a triggered refill funding procedure for the pre-paid customer account in response (1010). The triggered refill funding procedure is explained in more detail below with reference to FIG. 13. As will also be explained, the triggered refill funding procedure and the scheduled refill funding procedure may be similar.

The triggered refill funding procedure may also include determining whether the automatic refill of the pre-paid customer account was successful (1012). Determining whether the automatic refill of the pre-paid customer account was successful may include receiving a message or other type of message indicating that the automatic refill was a success. For example, it is possible that the triggered refill channel 114 sends a message to itself, such as by saving the message in a log or storing the contents of the message in a database or other data repository for future reference. In one implementation, where the triggered refill channel 114 determines that the automatic refill of the pre-paid customer account was unsuccessful, the triggered refill channel 114 may transmit a message indicating that the automatic refill of the pre-paid customer account using the triggered refill channel was unsuccessful (1014). This message may be transmitted to one or more systems in communication with the automatic refill system 102, including the billing system 112. However, where the triggered refill channel 114 determines that the automatic refill of the pre-paid customer account was successful, the triggered refill channel 114 may transmit a message indicating that the automatic refill was successful (1016). The triggered refill channel 114 may also transmit this message to one or more systems in communication with the automatic refill system 102, including the billing system 112. The unsuccessful message, the successful message, or combinations thereof, may be used by one or more systems in determining whether the triggered refill channel 114 was successful in automatically refilling a pre-paid customer account.

The triggered refill channel 114 may be operable to refill a pre-paid customer account in real-time, on a batch basis, or combinations thereof. In one real-time implementation, the billing system 112 may communicate with the triggered refill channel 114 to refill a pre-paid customer account at predetermined time intervals while a customer is using an authorized service. For example, suppose that a customer balance is $100.00 and a customer has requested to use a service where the cost of the service is $0.05 per second. Further suppose that the triggered refill channel 114 is configured to determine whether a customer requires a refill every second and that the threshold amount for the pre-paid customer account is $10.00. In this example, the triggered refill channel 114 checks every second while the customer uses the service to determine whether the balance of the pre-paid customer account is less than the threshold amount. Using the example above, if the balance on the pre-paid customer account draws down to $10.00 after 1,800 seconds, at the 1,801st second, the triggered refill channel 114 will attempt to automatically refill the pre-paid customer account.

Alternatively, the triggered refill channel 114 may be configured to automatically refill the pre-paid customer account on a batch basis. A batch basis may include where the automatic refill system 102 is configured to calculate the balance on the pre-paid customer account after a predetermined number of service usages. For example, the billing system 112 may activate the triggered refill channel 114 after the customer has requested 10 authorized services. Alternatively, the billing system 112 may activate the triggered refill channel 114 after the automatic refill system 102 has authorized a single service usage for the customer. Thus, the triggered refill channel 114 may be configured to activate in a real-time manner, on a batch basis, or combinations thereof.

Figure 11:
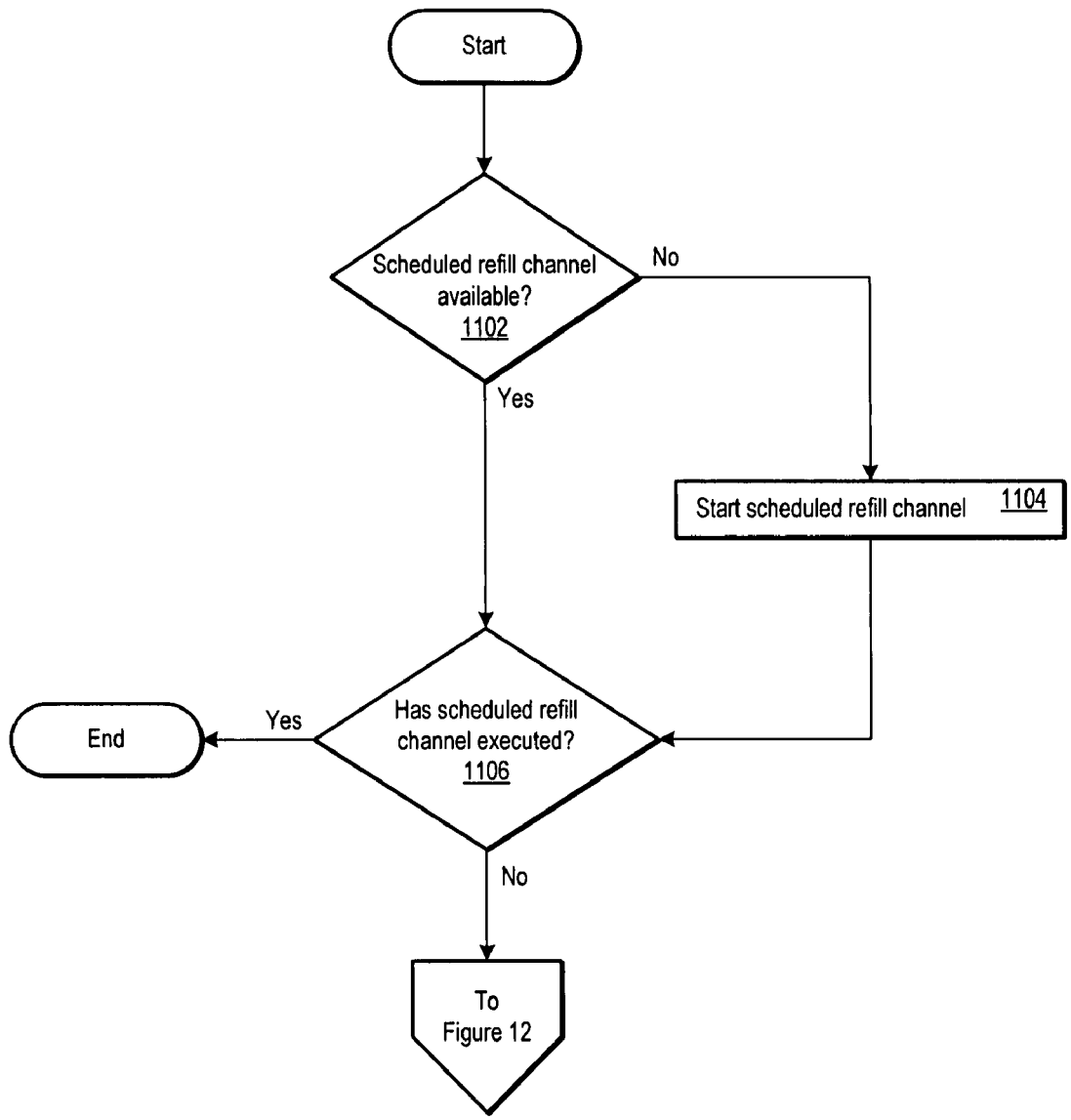
FIG. 11 shows processing flow of initial configuration actions for a scheduled refill channel.

As previously mentioned, the scheduled refill channel 116 may be activated for a pre-paid customer account. FIG. 11 shows processing flow of initial configuration actions for a scheduled refill channel 116. In contrast to the triggered refill channel 114, the scheduled refill channel 116 may configured to refill pre-paid customer accounts at a predetermined schedule, such as on a daily basis, a weekly basis, a monthly basis, any other time interval now known or later developed, or combinations thereof. In one implementation, the billing system 112 may initially determine whether the scheduled refill channel 116 is available for use (1102). Determining whether the scheduled refill channel 116 is available may include sending a message to the scheduled refill channel 116 and waiting for an acknowledgment message from the scheduled refill channel 116. Where the billing system 112 determines that the scheduled refill channel 116 is not available, such as by not receiving an acknowledgment message after a predetermined time interval, the billing system 112 then starts or activates the scheduled refill channel (1104). Where the billing system 112 determines that the scheduled refill channel 116 is available, the billing system 112 then may then determine whether the scheduled refill channel 116 has executed according to predetermined schedule (1106).

If the billing system 112 determines that the scheduled refill channel 116 has executed at the time interval according to its predetermined schedule, the billing system 112 may then wait until the next time interval of the scheduled refill channel 116 before re-determining whether the scheduled refill channel 116 is available. In this manner, the billing system 112 may be able to ensure that the scheduled refill channel is available for each of its scheduled time intervals. Alternatively, the billing system 112 may have its own predetermined schedule for determining whether the scheduled refill channel 116 is available. Where the scheduled refill channel 116 is available, but has not executed, the billing system 112 may then instruct the scheduled refill channel 116 to execute.

Figure 12:
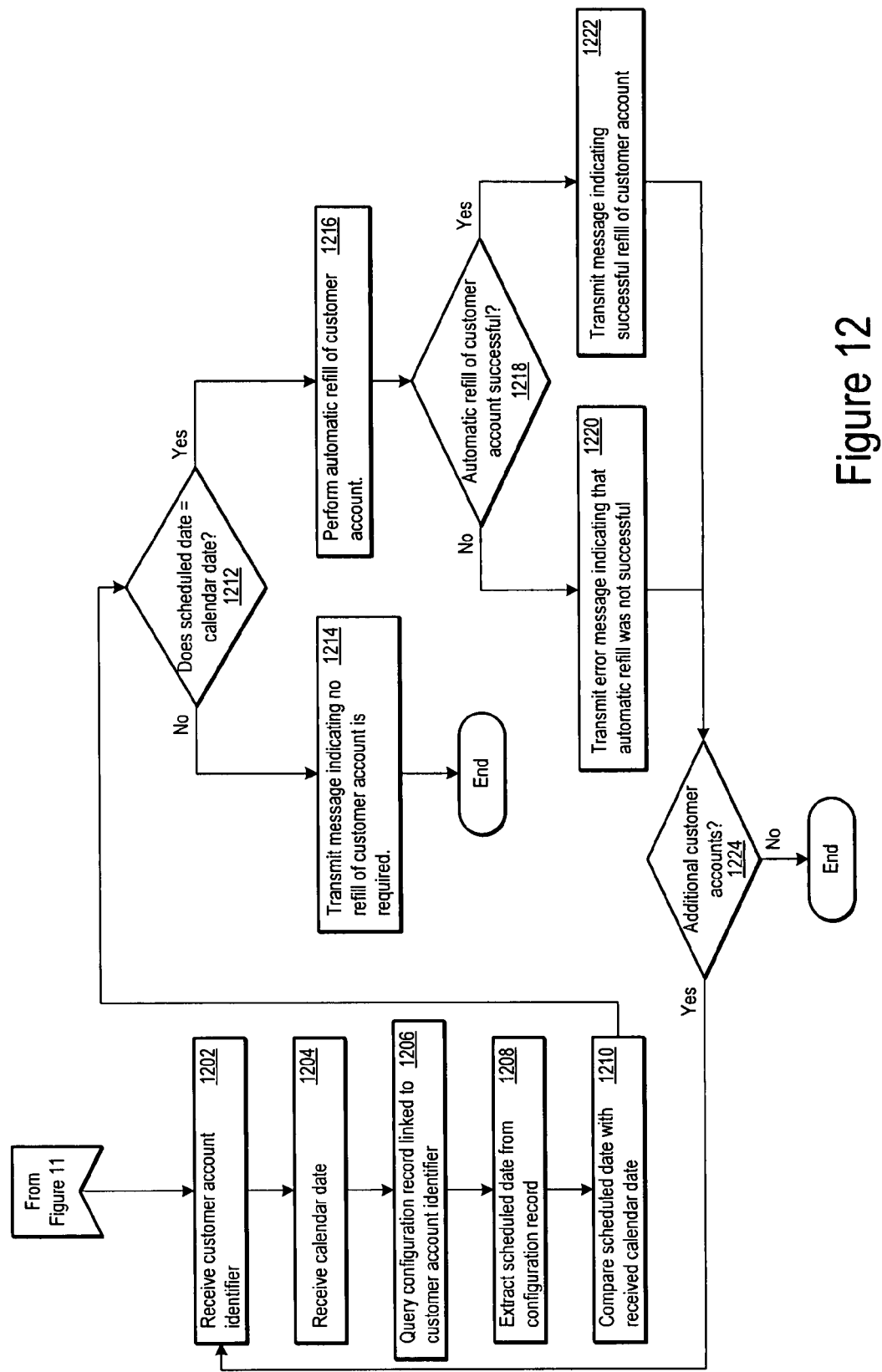
FIG. 12 shows processing flow of refilling a customer account using the scheduled refill channel.

FIG. 12 shows processing flow of refilling a pre-paid customer account using the scheduled refill channel 116. In one implementation, the scheduled refill channel 116 is configured to execute for each of the pre-paid customer accounts maintained by the automatic refill system 102. However, the automatic refill system 102 may further analyze the refill activation data field 214 of each corresponding configuration record 292 for each of the pre-paid customer accounts to determine whether to refill a pre-paid customer account. Thus, where the refill activation data field 214 indicates that the scheduled refill channel is activated for a pre-paid customer account, the scheduled refill channel 116 may execute for that pre-paid customer account. FIG. 12 illustrates one or more of those actions that the scheduled refill channel 116 may take where the refill activation data 214 field indicates that the scheduled refill channel 116 is activated for a pre-paid customer account.

In one implementation, the scheduled refill channel 116 may initially receive a pre-paid customer account identifier for the pre-paid customer account (1202). The pre-paid customer account identifier may have been previously received by one or more systems of the automatic refill system 102. For example, the billing system 112 may initially use one or more pre-paid customer account identifiers to retrieve one or more configuration records 202 to determine whether the scheduled refill channel 116 is activated for one or more pre-paid customer accounts. In this example, the scheduled refill channel 116 may receive the pre-paid customer account identifier from the billing system 112. However, the scheduled refill channel 116 may also receive the pre-paid customer account identifier from other systems, such as the customer relation management system 108, the pre-paid balance manager 110, the network 124, any other system in communication with the automatic refill system 102, or combinations thereof.

The scheduled refill channel 116 may then receive a calendar date (1204). The calendar date may be representative of the current date on which the scheduled refill channel 116 has executed. Alternatively, the calendar date may be any other measure of time, including second, minutes, hours, days, weeks, months, years, or combinations thereof. The scheduled refill channel 116 may receive the calendar date from the billing system 112, any other system of the automatic refill system 102, or combinations thereof. The scheduled refill channel 116 may also internally track the calendar date.

After receiving the calendar date (1204), the scheduled refill channel 116 may then query the configuration record 202 linked with the pre-paid customer account identifier (1206) and extract a calendar date representative of the regularly scheduled refill condition from the scheduled condition data field 222 of the configuration record 202 (1208). As previously discussed, the calendar date stored by the scheduled condition data field 222 may be a calendar date representative of when the scheduled refill channel 116 should execute a scheduled refill funding procedure to refill a pre-paid customer account. The scheduled refill channel 116 may then compare the calendar date stored by the scheduled condition data field 222 with the calendar date previously received (1210).

By comparing the previously received calendar date with the calendar date stored by the scheduled condition data field 222, the scheduled refill channel 116 may determine whether to execute a scheduled refill funding procedure for the pre-paid customer account (1212). For example, where the previously received calendar date is equal with the calendar date stored by the scheduled condition data field 222, the scheduled refill channel 116 may determine that the scheduled refill condition has been met. In response, the scheduled refill channel 116 may automatically refill the pre-paid customer account by performing a scheduled refill funding procedure (1216). In contrast, where the previously received calendar date is not equal to the calendar date stored by the scheduled refill condition data field 222, the scheduled refill channel 116 may transmit a message indicating that it did not automatically refill the pre-paid customer account (1214). The scheduled refill channel 116 may transmit this message to one or more systems in communication with the automatic refill system 102, such as the billing system 112, the self care system 106, the customer relation management system 108, the pre-paid balance manager 110, the network 124, any other system in communication with the automatic refill system 102, or combinations thereof.

As mentioned above, the scheduled refill channel 116 may execute a scheduled refill funding procedure for the pre-paid customer account (116). One implementation of the scheduled refill funding procedure is discussed with reference to FIG. 13. As previously mentioned with regard to the triggered refill funding procedure, the scheduled refill funding procedure may be similar to the triggered refill funding procedure. The scheduled refill funding procedure may further include modifying the executed date data field 224 of the configuration record 202 to reflect the date, time, or combination thereof, for the most recent executed scheduled refill funding procedure for a corresponding pre-paid customer account.

The scheduled refill funding procedure may also include determining whether the automatic refill of the pre-paid customer account was successful (1218). The executed date data field 224 may also include indicating whether the executed scheduled refill funding procedure was successful. Determining whether the automatic refill of the pre-paid customer account was successful may include receiving a message or other type of message indicating that the automatic refill was a success. For example, it is possible that the scheduled refill channel 116 sends a message to itself, such as by saving the message in a log or storing the contents of the message in a database or other data repository for future reference. In one implementation, where the scheduled refill channel 116 determines that the automatic refill of the pre-paid customer account was unsuccessful, the scheduled refill channel 116 may transmit a message indicating that the automatic refill of the pre-paid customer account using the scheduled refill channel was unsuccessful (1220). This message may be transmitted to one or more systems in communication with the automatic refill system 102, including the billing system 112.

However, where the scheduled refill channel 116 determines that the automatic refill of the pre-paid customer account was successful, the scheduled refill channel 116 may transmit a message indicating that the automatic refill was successful (1222). The scheduled refill channel 114 may also transmit this message to one or more systems in communication with the automatic refill system 102, including the billing system 112. The unsuccessful message, the successful message, or combinations thereof, may be used by one or more systems in determining whether the scheduled refill channel 116 was successful in automatically refilling a pre-paid customer account.

After executing or not executing a scheduled refill funding procedure for a pre-paid customer account, the scheduled refill channel 116 then determines whether there are remaining pre-paid customer accounts on which to execute (1224). This determination may be made by analyzing or examining the executed date data field 224 for one or more configuration records 202 corresponding to one or more pre-paid customer accounts, and comparing the executed date data fields 224 with the received calendar date. The scheduled refill channel 116 may also make this determination in conjunction with a determination by the billing system 112 that the scheduled refill channel 116 is activated for one or more pre-paid customer accounts.

Where the scheduled refill channel 116 determines that there are remaining pre-paid customer accounts on which to execute, the scheduled refill channel 116 selects another pre-paid customer account on which execute that satisfies the previous two criteria. In one implementation, the scheduled refill channel 116 proceeds in a similar manner as described above with reference to FIG. 12, and continues doing so until there are no more pre-paid customer accounts where the executed date data field 224 is different than received calendar date and the scheduled refill channel 116 is activated for the pre-paid customer account.

Figure 13:
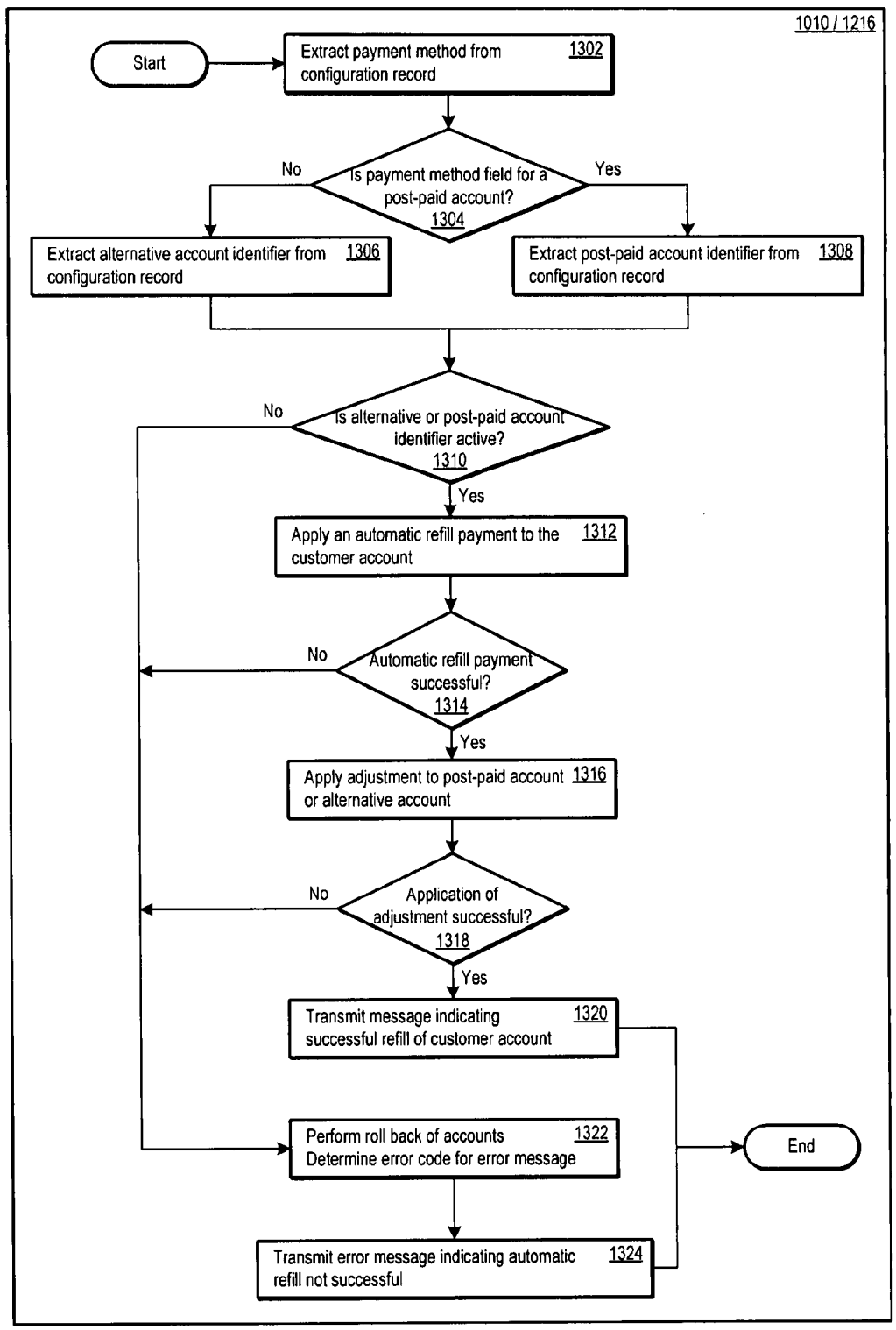
FIG. 13 shows processing flow of executing a triggered refill funding procedure and a scheduled refill funding procedure.

FIG. 13 shows an example of automatic refill channel funding in connection with automatic refill channels. Triggered refill channels and scheduled refill channels are examples of automatic refill channels.

In performing an automatic refill, the billing system 112 may call a script or other program. In case of the triggered refill channel it is a program implemented using the Expression Parser Module (EPM) of Singl.eView™ and the code is integrated with code that performs the rating of each usage event. In case of scheduled refill channel 116 may be implemented as a daily Singl.eView™ task that calls a Perl™

In one implementation, an automatic refill channel may initially extract an identifier representative of the type of method the automatic refill channel uses to refill the pre-paid customer account (1302). As previously discussed, the identifier may indicate that the automatic refill channel should use a post-paid account to refill the pre-paid customer account, or that the automatic refill channel should use an alternative account, such as a credit card or bank account, to refill the pre-paid customer account. The automatic refill channel may then determine whether the payment method identifier is for the automatic refill channel to use a post-paid account to refill the pre-paid customer account or an alternative account (1304). Determining whether the identifier stored by the payment method data field 226 is for post-paid customer account or for an alternative account may include querying one or more systems in communication with the automatic refill system 102. For example, the automatic refill channel may transmit the payment method identifier to the customer relation management system 108 to determine whether the payment method identifier is for a post-paid customer account.

Where the automatic refill channel determines that the payment method identifier is for an alternative account, the automatic refill channel extracts the alternative account identifier from the post-paid account data field 228 of the configuration record 202 (1306). As discussed above, the post-paid account data field 228 may be operable to store an identifier for an alternative account, a post-paid account, or combinations thereof. Similarly, where the automatic refill channel determines that the payment method identifier is for a post-paid account, the automatic refill channel extracts the post-paid account identifier from the post-paid account data field 228 (1308).

After extracting the alternative account identifier, the post-paid account identifier, or combinations thereof, the automatic refill channel may then determine whether the alternative or post-paid account is active (1310). Where the automatic refill channel extracts an alternative account identifier, the automatic refill channel may make this determination by communicating with an external system using network 124. Where the automatic refill channel extracts a post-paid account identifier, the automatic refill channel may communicate with one or more systems of the automatic refill system 102 to determine whether the post-paid account is active. For example, the customer relation management system 108 may have disabled the post-paid account associated with the post-paid account identifier due to a lack of funds or a long-term standing overdue balance by the post-paid account customer. In making this determination, the automatic refill channel may receive one or more messages indicating that the post-paid account linked with the configuration record 202 identified by the post-paid account identifier is active or inactive.

Where the post-paid account is indicated as active, the automatic refill channel may apply an automatic refill payment to the pre-paid customer account (1312). Applying an automatic refill payment to the pre-paid customer account may further include extracting the refill amount from the refill amount data field 218 of the configuration record 202 linked to the pre-paid customer account. Applying an automatic refill payment may also include applying the refill amount data 218 field to the balance on the customer account, such as by incrementing the balance on the pre-paid customer account by an amount corresponding to the refill amount.

After applying the automatic refill payment, the automatic refill channel may then determine whether the application of the automatic refill payment was successful (1314). In one implementation, automatic refill channel may make this determination by comparing the balance of the pre-paid account before the application of the automatic refill payment with the balance of the pre-paid account after the application of the automatic refill payment. Alternatively, the automatic refill channel may inspect the balance of the pre-paid customer account for any remaining amounts. In this implementation, a remaining balance on the pre-paid customer account may indicate that the application of the automatic refill payment was not successful.

In the event that the application of the automatic refill payment was successful, the automatic refill channel then applies a corresponding adjustment to the post-paid account or alternative account linked to the pre-paid customer account (1316). Applying an adjustment to the post-paid account may include increasing an amount owed by the post-paid customer account and maintained by the automatic refill system 102. Applying an adjustment to an alternative account may include transmitting a message to an external system for a request for payment, to debit a bank account, to charge a credit card, or combinations thereof.

In performing an adjustment, an automatic refill channel may call a script or other program. The billing interface to allocate adjustment is called passing specific values for automatic refill. The parameters and their corresponding values for applying an adjustment are listed below in Table 7:

TABLE 7

| Parameter | Value Field |
| --- | --- |
| EventSource | <value> |
| Channel | 'Automatic Refill' |
| TransactionCode | <value> |
| Amount | <RefillAmount> |
| RequestDate | <RefillDate> |
| PaymentMethod | 'Invoice Refill' |

The automatic refill channel may then determine whether the application of the adjustment to the post-paid account, the alternative account, or combinations thereof, was successful (1318). Where the application of the adjustment to the post-paid account, the alternative account, or combinations thereof is successful, the automatic refill channel transmits a message indicating that a successful automatic refill of the pre-paid customer account occurred (1320). This message may be sent to any system in communication with the automatic refill system 102, including the billing system 112, and one or more automatic refill channels. Furthermore, the message may adjust the status of the pre-paid customer account to show that the pre-paid customer account was refilled. Adjusting the status of the pre-paid customer account may include modifying the data field REFILL_STATUS of Table 5.

There may be instances where the automatic refill of the pre-paid customer account is not successful. For example, this situation may occur where the post-paid account or alternative is not active, where the automatic refill payment was not successful, where the application of the adjustment to the post-paid account or alternative account was not successful, or combinations thereof. In these instances, the automatic refill channel may perform a roll back for one or more accounts, and it may determine an error for transmitting a message (1320). In one implementation, the error may be stored as a data field, such as in the ERROR_CODE field and the ERROR_DESCRIPTION field, shown in Table 5.

In performing a rollback of the pre-paid customer account, the post-paid customer account, or combinations thereof, the automatic refill channel may deduct the automatic refill payment from the pre-paid customer account when the adjustment applied to the post-paid account is not successful. Rolling back the pre-paid account, post-paid account, or combinations thereof, may also include restoring one or more data fields 204-220, such as the refill amount data field 218, the balance maintained by the configuration record 202, any other data data fields of the configuration record 202, or combinations thereof. The automatic refill channel may then transmit a message to indicate that the automatic refill of the pre-paid customer account was not successful (1324). Transmitting this message may include transmitting this message to one or more systems in communication with the automatic refill system 102, including the billing system 112 and the automatic refill channel.

One benefit of the automatic refill system 102 is that it is able to automatically refill one or more pre-paid accounts. Automatically refilling pre-paid accounts provides enhanced funding flexibility for customers and additional revenue streams for a telecommunication service provider. The automatic refill system 102 solves the technical challenges involved with implementing a scheduled refill channel co-existing with a triggered refill channel for funding a pre-paid account.

It is noted that in the discussion of the Figures, regardless of the particular implementation being described, is exemplary in nature, rather than limiting. For example, although selected aspects, features, or components of the implementations are depicted as being stored in memories, all or part of systems and methods consistent with the reverse rating systems and method may be stored on, distributed across, or read from other machine-readable media, for example, secondary storage devices such as hard disks, floppy disks, and CD-ROMs; a signal received from a network; or other forms of ROM or RAM either currently known or later developed.

Furthermore, although specific components of the automatic refill system are described, methods, systems, and articles of manufacture consistent with the automatic refill system may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, and other data structures may be separately stored and managed, may be incorporated into a single memory or database, may be distributed, or may be logically and physically organized in many different ways. Programs may be parts of a single program, separate programs, or distributed across several memories and processors.

Furthermore, while various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A telecommunication service provider automatic refill system comprising:
 a customer account linked with a configuration record operable to identify whether only a triggered refill channel is activated on the customer account, whether only a scheduled refill channel is activated on the customer account, and whether both the triggered refill channel and scheduled refill channel are activated on the customer account;

a billing system operable to receive a customer account identifier that identifies the customer account and operable to analyze the configuration record linked to the customer account identifier to determine whether a triggered refill condition is met for the customer account, that a regularly scheduled refill condition is met for the customer account, or that both the regularly scheduled refill condition and triggered refill condition are met for the customer account;

a triggered refill channel in communication with the billing system, the triggered refill channel operable to execute a triggered refill funding procedure for the customer account when the triggered refill condition is met for the customer account; and a scheduled refill channel in communication with the billing system, the scheduled refill channel operable to execute a scheduled refill funding procedure for the customer account when the regularly scheduled refill condition is met for the customer account.

2. The system of claim 1 where the configuration record comprises:

an executed date data field operable to store a calendar date representing when the scheduled refill funding procedure was executed;

a refill activation data field operable to store an identifier identifying whether only the triggered refill channel is activated, only the scheduled refill channel is activated, or the triggered refill channel and the scheduled refill channel are activated;

a refill status data field operable to store an identifier representative of a refill status;

a refill amount data field operable to store an identifier representative of a refill amount;

a scheduled condition data field operable to store a calendar date representative of the regularly scheduled refill condition; and a triggered refill amount data field operable to store a value representative of the triggered refill condition.

3. The system of claim 1 where the triggered refill condition comprises a predetermined threshold of an amount representative of a monetary value for a balance remaining in a customer account.

4. The system of claim 1 where:

the customer account comprises a pre-paid customer account; and the triggered refill channel is operable to execute the triggered refill funding procedure by being operable to:

determine an automatic refill payment to apply to the pre-paid customer account;

determine a post-paid account identifier associated with the pre-paid customer account; and, determine whether a post-paid account associated with the post-paid account identifier is active; and, the triggered refill channel is further operable to:

apply the automatic refill payment to the pre-paid customer account; and apply an adjustment to a post-paid account corresponding to the post-paid account identifier in an amount equal to the automatic refill payment applied to the pre-paid customer account, when the triggered refill channel determines that the post-paid account is active.

5. The system of claim 4 where the triggered refill channel is further operable to:

determine whether applying the adjustment to the post-paid account is successful; and deduct the automatic refill payment from the pre-paid customer account when the adjustment applied to the post-paid account is not successful.

6. The system of claim 1 where the regularly scheduled refill condition comprises a calendar date.

7. The system of claim 1 where:

the customer account comprises a pre-paid customer account; and the scheduled refill channel is operable to execute the scheduled refill funding procedure by being operable to:

determine an automatic refill payment to apply to the pre-paid customer account;

determine a post-paid account identifier associated with the pre-paid customer account; and, determine whether a post-paid account associated with the post-paid account identifier is active; and, the scheduled refill channel is further operable to:

apply the automatic refill payment to the pre-paid customer account; and apply an adjustment to a post-paid account corresponding to the post-paid account identifier in an amount equal to the automatic refill payment applied to the pre-paid customer account, when the scheduled refill channel determines that the post-paid account is active.

8. The system of claim 7 where the scheduled refill channel is further operable to:

determine whether applying the adjustment to the post-paid account is successful; and deduct the automatic refill payment from the pre-paid customer account when the adjustment applied to the post-paid account is not successful.

9. A telecommunication service provider automatic refill method comprising:

receiving a customer account identifier for a customer account;

querying a configuration record linked to the customer account identifier to determine that only a triggered refill channel is activated on the customer account, that only a scheduled refill channel is activated on the customer account, or that both the triggered refill channel and scheduled refill channel are activated on the customer account;

implementing multiple refill channel configuration options for the customer account by:

determining when only the triggered refill channel is activated, or when both the triggered refill channel and scheduled refill channel are activated, and in response:

establishing a triggered refill condition for the customer account;

determining that the triggered refill condition is met; and responsively executing a triggered refill funding procedure for the customer account; and determining when only the scheduled refill channel configuration is activated, or when both the triggered refill channel and scheduled refill channel are activated, and in response:

establishing a regularly scheduled refill condition for the customer account;

determining that the regularly scheduled refill condition is met; and responsively executing a scheduled refill funding procedure for the customer account.

10. The method of claim 9 where the configuration record comprises:
an executed date data field operable to store a calendar date representing when the scheduled refill funding procedure was executed;
a refill activation data field operable to store an identifier identifying whether only the triggered refill channel is activated, only the scheduled refill channel is activated, or the triggered refill channel and the scheduled refill channel are activated;
a refill status data field operable to store an identifier representative of a refill status;
a refill amount data field operable to store an identifier representative of a refill amount;
a scheduled condition data field operable to store a calendar date representative of the regularly scheduled refill condition; and
a triggered refill amount data field operable to store value representative of the triggered refill condition.

11. The method of claim 9 where the triggered refill condition comprises a predetermined threshold of an amount representative of a monetary value for a balance remaining in a customer account.

12. The method of claim 11 where establishing a triggered refill condition for the customer account comprises:
receiving the predetermined threshold amount; and
storing the predetermined threshold amount in the configuration record linked to the customer account identifier.

13. The method of claim 9 where responsively executing a triggered refill funding procedure comprises:
determining an automatic refill payment to apply to the customer account;
determining a post-paid account identifier associated with the customer account; and,
determining whether a post-paid account associated with the post-paid account identifier is active, and
where the post-paid account is active:
applying the automatic refill payment to the customer account; and,
applying an adjustment to a post-paid account corresponding to the post-paid account identifier in an amount equal to the automatic refill payment applied to the customer account.

14. The method of claim 13 further comprising:
determining whether the adjustment applied to the post-paid account was successful; and
where the adjustment applied to the post-paid account was not successful, deducting the automatic refill payment from the customer account.

15. The method of claim 9 where the regularly scheduled refill condition comprises a calendar date.

16. The method of claim 15 where establishing the regularly scheduled refill condition for the customer account comprises:
receiving the calendar date; and
storing the calendar date in the configuration record linked to the customer account identifier.

17. The method of claim 9 where responsively executing the scheduled refill funding procedure comprises:
determining an automatic refill payment to apply to the customer account;
determining a post-paid account identifier associated with the customer account; and,
determining whether a post-paid account associated with the post-paid account identifier is active, and where the post-paid account is active:
applying the automatic refill payment to the customer account; and
applying an adjustment to a post-paid account corresponding to the post-paid account identifier in an amount equal to the automatic refill payment applied to the customer account.

18. The method of claim 9 further comprising:
determining whether the adjustment applied to the post-paid account was successful; and
where the adjustment applied to the post-paid account was not successful, deducting the automatic refill payment from the customer account.

19. A product comprising:
a machine readable medium; and
logic stored on the medium operable to:
receive a customer account identifier for a customer account;
query a configuration record linked to the customer account identifier to determine that only a triggered refill channel is activated on the customer account, that only a scheduled refill channel is activated on the customer account, or that both the triggered refill channel and scheduled refill channel are activated on the customer account;
implement multiple refill channel configuration options for the customer account by being operable to:
determine when only the triggered refill channel is activated, or when both the triggered refill channel and scheduled refill channel are activated, and responsively operable to:
establish a triggered refill condition for the customer account;
determine that the triggered refill condition is met; and
execute a triggered refill funding procedure for the customer account; and
determine when only the scheduled refill channel configuration is activated, or when both the triggered refill channel and scheduled refill channel are activated, and responsively operable to:
establish a regularly scheduled refill condition for the customer account;
determine that the regularly scheduled refill condition is met; and
execute a scheduled refill funding procedure for the customer account.

20. The product of claim 19 where the configuration record comprises:
an executed date data field operable to store a calendar date representing when the scheduled refill funding procedure was executed;
a refill activation data field operable to store an identifier identifying whether only the triggered refill channel is activated, only the scheduled refill channel is activated, or the triggered refill channel and the scheduled refill channel are activated;
a refill status data field operable to store an identifier representative of a refill status;
a refill amount data field operable to store an identifier representative of a refill amount;
a scheduled condition data field operable to store a calendar date representative of the regularly scheduled refill condition; and
a triggered refill amount data field operable to store a value representative of the triggered refill condition.

21. The product of claim 19 where:

the customer account comprises a pre-paid customer account; and the logic is further operable to execute the triggered refill funding procedure by being operable to:

determine an automatic refill payment to apply to the pre-paid customer account;

determine a post-paid account identifier associated with the pre-paid customer account; and, determine whether a post-paid account associated with the post-paid account identifier is active; and, the logic is further operable to:

apply the automatic refill payment to the pre-paid customer account; and apply an adjustment to a post-paid account corresponding to the post-paid account identifier in an amount equal to the automatic refill payment applied to the pre-paid customer account, when the logic determines that the post-paid account is active.

22. The product of claim 21 where the logic is further operable to:

determine whether applying the adjustment to the post-paid account is successful; and deduct the automatic refill payment from the pre-paid customer account when the logic determines that the adjustment applied to the post-paid account is not successful.

23. The product of claim 19 where:

the customer account comprises a pre-paid customer account; and the logic is operable to execute the scheduled refill funding procedure by being operable to:

determine an automatic refill payment to apply to the pre-paid customer account;

determine a post-paid account identifier associated with the pre-paid customer account; and, determine whether a post-paid account associated with the post-paid account identifier is active; and, the logic is further operable to:

apply the automatic refill payment to the pre-paid customer account; and apply an adjustment to a post-paid account corresponding to the post-paid account identifier in an amount equal to the automatic refill payment applied to the pre-paid customer account, when the logic determines that the post-paid account is active.

24. The product of claim 23 where the logic is further operable to:

determine whether applying the adjustment to the post-paid account is successful; and deduct the automatic refill payment from the pre-paid customer account when the logic determines that the adjustment applied to the post-paid account is not successful.

\* \* \* \* \*